(12) United States Patent
Lin et al.

(10) Patent No.: US 10,986,371 B2
(45) Date of Patent: Apr. 20, 2021

(54) SAMPLE ADAPTIVE OFFSET FILTERING METHOD FOR RECONSTRUCTED PROJECTION-BASED FRAME THAT EMPLOYS PROJECTION LAYOUT OF 360-DEGREE VIRTUAL REALITY PROJECTION

(71) Applicant: MEDIATEK INC., Hsin-Chu (TW)

(72) Inventors: Sheng-Yen Lin, Hsin-Chu (TW); Lin Liu, Beijing (CN); Jian-Liang Lin, Hsin-Chu (TW)

(73) Assignee: MEDIATEK INC., Hsin-Chu (TW)

( * ) Notice: Subject to any disclaimer, the term of this patent is extended or adjusted under 35 U.S.C. 154(b) by 35 days.

(21) Appl. No.: 16/361,213

(22) Filed: Mar. 22, 2019

(65) Prior Publication Data
US 2019/0297350 A1 Sep. 26, 2019

Related U.S. Application Data

(60) Provisional application No. 62/646,389, filed on Mar. 22, 2018.

(30) Foreign Application Priority Data

Mar. 21, 2019 (WO) ................ PCT/CN2019/079015

(51) Int. Cl.
*H04N 19/597* (2014.01)
*H04N 19/117* (2014.01)
(Continued)

(52) U.S. Cl.
CPC ......... *H04N 19/597* (2014.11); *G06K 9/6267* (2013.01); *H04N 19/117* (2014.11); *H04N 19/176* (2014.11)

(58) Field of Classification Search
CPC .. H04N 19/597; H04N 19/117; H04N 19/176; G06K 9/6267
See application file for complete search history.

(56) References Cited

U.S. PATENT DOCUMENTS

2012/0177107 A1* 7/2012 Fu ........................ H04N 19/167
375/240.03
2014/0341287 A1 11/2014 Mody
2017/0230668 A1* 8/2017 Lin ....................... H04N 19/563

FOREIGN PATENT DOCUMENTS

WO 2013/060250 A1 5/2013
WO 2017/211294 A1 12/2017
(Continued)

OTHER PUBLICATIONS

Yuwen He et al., AHG8: Geometry padding for 360 video coding, Document:JVET-D0075 in the 4th Meeting of the Joint Video Exploration Team (JVET) of ITU-T SG 16 WP 3 and ISO/IEC JTC 1/SC 29/WG 11, Chengdu, CN, Oct. 15, 2016(Oct. 15, 2016) abstract; sections 1-2; figures 10-12.
(Continued)

*Primary Examiner* — Obafemi O Sosanya
(74) *Attorney, Agent, or Firm* — Winston Hsu

(57) ABSTRACT

A sample adaptive offset (SAO) filtering method for a reconstructed projection-based frame includes: obtaining at least one padding pixel in a padding area that acts as an extension of a face boundary of a first projection face, and applying SAO filtering to a block that has at least one pixel included in the first projection face. In the reconstructed projection-based frame, there is image content discontinuity between the face boundary of the first projection face and a face boundary of a second projection face. The at least one padding pixel is involved in the SAO filtering of the block.

14 Claims, 14 Drawing Sheets

(51) Int. Cl.
*H04N 19/176* (2014.01)
*G06K 9/62* (2006.01)

(56) References Cited

FOREIGN PATENT DOCUMENTS

| WO | 2017/222301 A1 | 12/2017 |
| WO | 2018/009746 A1 | 1/2018 |
| WO | 2018/036447 A1 | 3/2018 |

OTHER PUBLICATIONS

"International Search Report" dated Jun. 28, 2019 for International application No. PCT/CN2019/079015, International filing date:Mar. 21, 2019.

* cited by examiner

SAMPLE ADAPTIVE OFFSET FILTERING METHOD FOR RECONSTRUCTED PROJECTION-BASED FRAME THAT EMPLOYS PROJECTION LAYOUT OF 360-DEGREE VIRTUAL REALITY PROJECTION

CROSS REFERENCE TO RELATED APPLICATIONS

This application claims the benefit of U.S. provisional application No. 62/646,389, filed on Mar. 22, 2018 and incorporated herein by reference.

BACKGROUND

The present invention relates to processing omnidirectional video content, and more particularly, to a sample adaptive offset (SAO) filtering method for a reconstructed projection-based frame that employs a projection layout of a 360-degree virtual reality (360 VR) projection.

Virtual reality (VR) with head-mounted displays (HMDs) is associated with a variety of applications. The ability to show wide field of view content to a user can be used to provide immersive visual experiences. A real-world environment has to be captured in all directions resulting in an omnidirectional image content corresponding to a sphere. With advances in camera rigs and HMDs, the delivery of VR content may soon become the bottleneck due to the high bitrate required for representing such a 360-degree image content. When the resolution of the omnidirectional video is 4K or higher, data compression/encoding is critical to bitrate reduction.

Data compression/encoding of the omnidirectional video may be achieved by a conventional video coding standard that generally adopt a block-based coding technique to exploit spatial and temporal redundancy. For example, the basic approach is to divide a source frame into a plurality of blocks (or coding units), perform intra prediction/inter prediction on each block, transform residues of each block, and perform quantization and entropy encoding. Besides, a reconstructed frame is generated to provide reference pixel data used for coding following blocks. For certain video coding standards, in-loop filter(s) may be used for enhancing the image quality of the reconstructed frame. For example, a sample adaptive offset (SAO) filter is used by a video encoder to minimize mean sample distortion of a region. A video decoder is used to perform an inverse operation of a video encoding operation performed by the video encoder. Hence, the video decoder also has in-loop filter(s) used for enhancing the image quality of the reconstructed frame. For example, an SAO filter is also used by the video decoder to reduce the distortion.

In general, the omnidirectional video content corresponding to the sphere is transformed into a sequence of images, each of which is a projection-based frame with a 360-degree image content represented by one or more projection faces arranged in a 360-degree Virtual Reality (360 VR) projection layout, and then the sequence of the projection-based frames is encoded into a bitstream for transmission. However, the projection-based frame may have image content discontinuity at picture boundaries (i.e., layout boundaries) and/or face edges (i.e., face boundaries). Hence, there is a need for an innovative SAO filter design that is capable of performing a more accurate SAO filtering process on any pixel located on one face boundary, and/or dealing with an SAO filtering process of any pixel located on one picture boundary.

SUMMARY

One of the objectives of the claimed invention is to provide a sample adaptive offset (SAO) filtering method for a reconstructed projection-based frame that employs a projection layout of a 360-degree virtual reality (360 VR) projection. For example, a padding-based SAO filtering method is employed by an SAO filter. In this way, an SAO filtering process of a pixel located on a face boundary can be more accurate, and/or an SAO filtering process of a pixel located on a picture boundary can work correctly.

According to a first aspect of the present invention, an exemplary sample adaptive offset (SAO) filtering method for a reconstructed projection-based frame is disclosed. The reconstructed projection-based frame comprises a plurality of projection faces packed in a projection layout of a 360-degree Virtual Reality (360 VR) projection from which a 360-degree image content of a sphere is mapped onto the projection faces. The exemplary SAO filtering method includes: obtaining, by an SAO filter, at least one padding pixel in a padding area that acts as an extension of a face boundary of a first projection face, and applying SAO filtering to a block. The projection faces packed in the reconstructed projection-based frame include the first projection face and a second projection face. In the reconstructed projection-based frame, the face boundary of the first projection face connects with a face boundary of the second projection face, and there is image content discontinuity between the face boundary of the first projection face and the face boundary of the second projection face. The block has at least one pixel included in the first projection face, and the least one padding pixel in the padding area is involved in the SAO filtering of the block.

According to a second aspect of the present invention, an exemplary sample adaptive offset (SAO) filtering method for a reconstructed projection-based frame is disclosed. The reconstructed projection-based frame includes at least one projection face packed in a projection layout of a 360-degree Virtual Reality (360 VR) projection from which a 360-degree image content of a sphere is mapped onto the projection faces. The exemplary SAO filtering method includes: obtaining, by an SAO filter, at least one padding pixel in a padding area that acts as an extension of a face boundary of a projection face packed in the reconstructed projection-based frame, and applying SAO filtering to a block. The face boundary of the projection face is a part of a picture boundary of the reconstructed projection-based frame. The block has at least one pixel included in the projection face, and the at least one padding pixel in the padding area is involved in the SAO filtering of the block.

According to a third aspect of the present invention, an exemplary sample adaptive offset (SAO) filtering method for a reconstructed projection-based frame is disclosed. The reconstructed projection-based frame includes a plurality of projection face packed in a projection layout of a 360-degree Virtual Reality (360 VR) projection from which a 360-degree image content of a sphere is mapped onto the projection faces. The exemplary SAO filtering method includes: obtaining, by an SAO filter, at least one padding pixel in a padding area that acts as an extension of a picture boundary of a first projection face packed in the reconstructed projection-based frame, and applying SAO filtering to a block. The projection faces packed in the reconstructed projection-based frame include the first projection face and a second projection face. In the reconstructed projection-based frame, the face boundary of the first projection face connects with a face boundary of the second projection face, and there is image content continuity between the face boundary of the first projection face and the face boundary of the second projection face. The block has at least one pixel included in the projection face, and the at least one padding pixel in the padding area is involved in the SAO filtering of the block.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
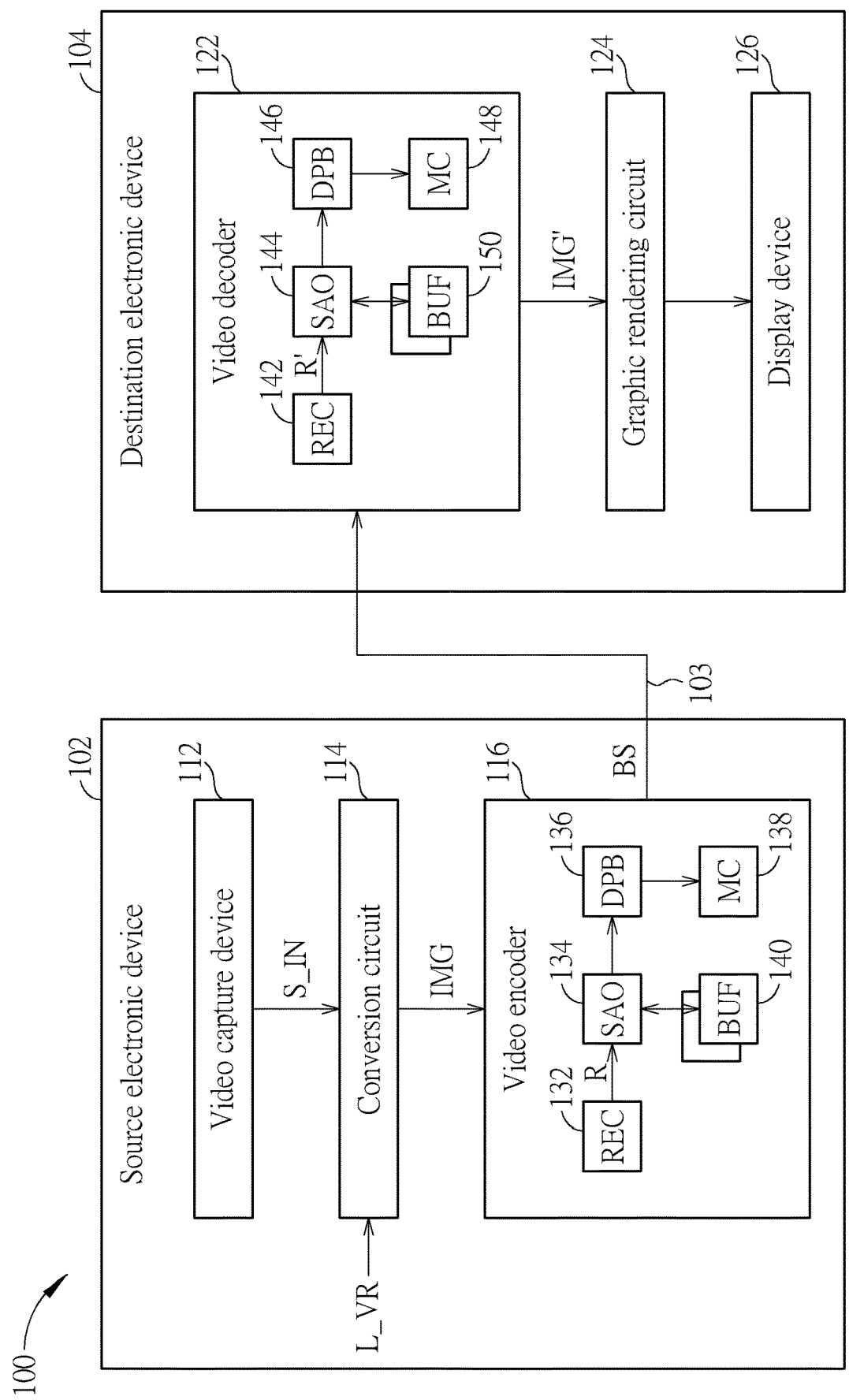
FIG. 1 is a diagram illustrating a 360-degree Virtual Reality (360 VR) system according to an embodiment of the present invention.

FIG. 1 is a diagram illustrating a 360-degree Virtual Reality (360 VR) system according to an embodiment of the present invention. The 360 VR system 100 includes two video processing apparatuses (e.g., a source electronic device 102 and a destination electronic device 104). The source electronic device 102 includes a video capture device 112, a conversion circuit 114, and a video encoder 116. For example, the video capture device 112 may be a set of cameras used to provide an omnidirectional image content (e.g., multiple images that cover the whole surroundings) S_IN corresponding to a sphere. The conversion circuit 114 is coupled between the video capture device 112 and the video encoder 116. The conversion circuit 114 generates a projection-based frame IMG with a 360-degree Virtual Reality (360 VR) projection layout L_VR according to the omnidirectional image content S_IN. For example, the projection-based frame IMG may be one frame included in a sequence of projection-based frames generated from the conversion circuit 114. The video encoder 116 is an encoding circuit used to encode/compress the projection-based frame IMG to generate a part of a bitstream BS. Further, the video encoder 116 outputs the bitstream BS to the destination electronic device 104 via a transmission means 103. For example, the sequence of projection-based frames may be encoded into the bitstream BS, and the transmission means 103 may be a wired/wireless communication link or a storage medium.

The destination electronic device 104 may be a head-mounted display (HMD) device. As shown in FIG. 1, the destination electronic device 104 includes a video decoder 122, a graphic rendering circuit 124, and a display device 126. The video decoder 122 is a decoding circuit used to receive the bitstream BS from the transmission means 103 (e.g., wired/wireless communication link or storage medium), and decode apart of the received bitstream BS to generate a decoded frame IMG'. For example, the video decoder 122 generates a sequence of decoded frames by decoding the received bitstream BS, where the decoded frame IMG' is one frame included in the sequence of decoded frames. In this embodiment, the projection-based frame IMG to be encoded by the video encoder 116 has the 360 VR projection layout L_VR. Hence, after a part of the bitstream BS is decoded by the video decoder 122, the decoded frame IMG' is a decoded projection-based frame having the same 360 VR projection layout L_VR. The graphic rendering circuit 124 is coupled between the video decoder 122 and the display device 126. The graphic rendering circuit 124 renders and displays an output image data on the display device 126 according to the decoded frame IMG'. For example, a viewport area associated with a portion of the 360-degree image content carried by the decoded frame IMG' may be displayed on the display device 126 via the graphic rendering circuit 124.

The video encoder 116 may employ a block-based coding scheme for encoding the projection-based frame IMG.

Hence, the video encoder 116 has an SAO filter (denoted by "SAO") 134 to reduce sample distortion which appears after block-based coding. Specifically, a reconstructed projection-based frame R generated from a reconstruction circuit (denoted by "REC") 132 can be used as a reference frame for coding following blocks, and is stored into a reference frame buffer (denoted by "DPB") 136 through the SAO filter 134. For example, a motion compensation circuit (denoted by "MC") 138 can use a block found in the reference frame to act as a predicted block. In addition, at least one working buffer (denoted by "BUF") 140 can be used to store reconstructed frame data and/or padding pixel data required by an SAO filtering process performed at the SAO filter 134.

The SAO filter 134 may be a sample-based SAO filter which is operated on a coding tree unit (CTU) basis. A CTU consists of coding tree blocks (CTB) of three color components. That is, the CTU has one luma CTB and two chroma CTBs. The luma CTB consists of luma (Y) samples. One chroma CTB consists of chroma (Cb) samples, and other chroma CTB consists of chroma (Cr) samples. In other words, the SAO filtering process may use a block (e.g., CTB) as a basic processing unit, where pixels in the block may be luma samples or chroma samples. In this embodiment, the SAO filtering process is performed on reconstructed frame data and/or padding pixel data stored in the working buffer(s) 140. The reconstructed projection-based frame R is generated by an internal decoding loop of the video encoder 116. In other words, the reconstructed projection-based frame R is reconstructed from encoded data of the projection-based frame IMG, and thus has the same 360 VR projection layout L_VR used by the projection-based frame IMG. It should be noted that the video encoder 116 may include other circuit blocks (not shown) required to achieve the designated encoding function.

The video decoder 122 is used to perform an inverse operation of a video encoding operation performed by the video encoder 116. Hence, the video decoder 122 has an SAO filter (denoted by "SAO") 144 to reduce the sample distortion. Specifically, a reconstructed projection-based frame R' generated from a reconstruction circuit (denoted by "REC") 142 can be used as a reference frame for decoding following blocks, and is stored into a reference frame buffer (denoted by "DPB") 146 through the SAO filter 144. For example, a motion compensation circuit (denoted by "MC") 148 can use a block found in the reference frame to act as a predicted block. In addition, at least one working buffer (denoted by "BUF") 150 can be used to store reconstructed frame data and/or padding pixel data required by an SAO filtering process performed at the SAO filter 144.

Like the SAO filter 134 at the encoder side, the SAO filter 144 at the decoder side may be a sample-based SAO filter which is operated on a CTU basis. The SAO filtering process may use a block (e.g., CTB) as a basic processing unit, where pixels in the block may be luma samples or chroma samples. The SAO filtering process is performed on reconstructed frame data and/or padding pixel data stored in the working buffer(s) 150. The reconstructed projection-based frame R' is reconstructed from encoded data of the projection-based frame IMG, and thus has the same 360 VR projection layout L_VR used by the projection-based frame IMG. In addition, the decoded frame IMG' may be generated by passing the reconstructed projection-based frame R' through the SAO filter 144. It should be noted that the video decoder 122 may include other circuit blocks (not shown) required to achieve the designated decoding function.

In one exemplary design, the SAO filter 134/144 may be implemented by dedicated hardware used to perform an SAO filtering process upon pixels in a block. In another exemplary design, the SAO filter 134/144 may be implemented by a general purpose processor that executes a program code to perform an SAO filtering process upon pixels in a block. However, these are for illustrative purposes only, and are not meant to be limitations of the present invention.

Figure 2:
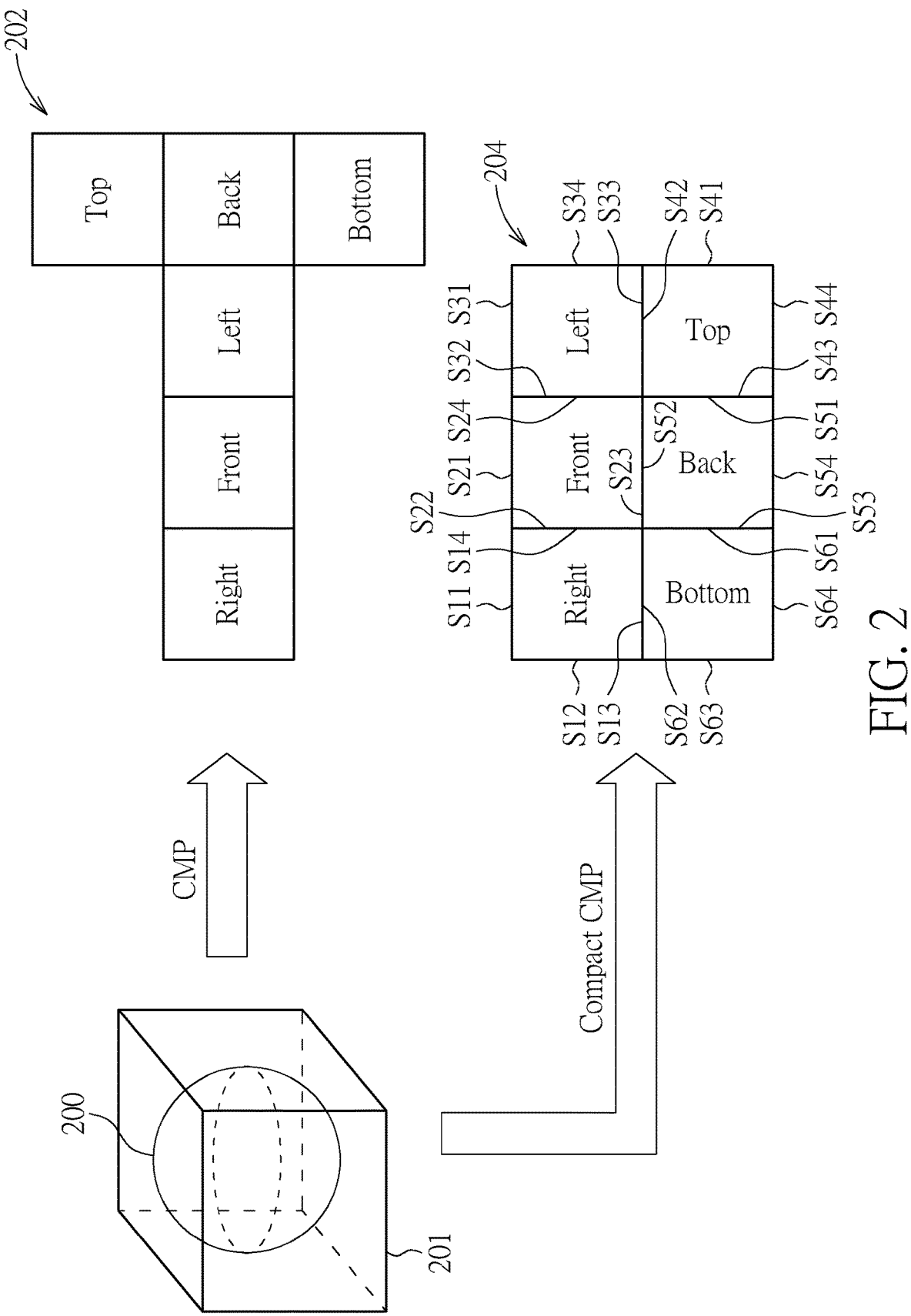
FIG. 2 is a diagram illustrating a cube-based projection according to an embodiment of the present invention.

As mentioned above, the conversion circuit 114 generates the projection-based frame IMG according to the 360 VR projection layout L_VR and the omnidirectional image content S_IN. In a case where the 360 VR projection layout L_VR is a cube-based projection layout, six square projection faces are derived from different faces of a cube through a cube-based projection of the omnidirectional image content S_IN on a sphere. FIG. 2 is a diagram illustrating a cube-based projection according to an embodiment of the present invention. The 360-degree image content on a sphere 200 is projected onto six faces of a cube 201, including a top face, a bottom face, a left face, a front face, a right face, and a back face. Specifically, an image content of a north polar region of the sphere 200 is projected onto the top face of the cube 201, an image content of a south polar region of the sphere 200 is projected onto the bottom face of the cube 201, and an image content of an equatorial region of the sphere 200 is projected onto the left face, the front face, the right face, and the back face of the cube 201.

Square projection faces to be packed in a projection layout of the cube-based projection are derived from six faces of the cube 201, respectively. For example, a square projection face (labeled by "Top") on a two-dimensional (2D) plane is derived from the top face of the cube 201 in a three-dimensional (3D) space, a square projection face (labeled by "Back") on the 2D plane is derived from the back face of the cube 201 in the 3D space, a square projection face (labeled by "Bottom") on the 2D plane is derived from the bottom face of the cube 201 in the 3D space, a square projection face (labeled by "Right") on the 2D plane is derived from the right face of the cube 201 in the 3D space, a square projection face (labeled by "Front") on the 2D plane is derived from the front face of the cube 201 in the 3D space, and a square projection face (labeled by "Left") on the 2D plane is derived from the left face of the cube 201 in the 3D space.

When the 360 VR projection layout L_VR is set by a cubemap projection (CMP) layout 202 shown in FIG. 2, the square projection faces "Top", "Back", "Bottom", "Right", "Front", and "Back" are packed in the CMP layout 202 corresponding to an unfolded cube. However, the projection-based frame IMG to be encoded is required to be rectangular. If the CMP layout 202 is directly used for creating the projection-based frame IMG, the projection-based frame IMG has to be filled with dummy areas (e.g., black areas, gray areas, or white areas) to form a rectangular frame for encoding. Alternatively, the projection-based frame IMG can have projected image data arranged in a compact projection layout to avoid using dummy areas (e.g., black areas, gray areas, or white areas). As shown in FIG. 2, the square projection faces "Top", "Back" and "Bottom" are rotated and then packed in the compact CMP layout 204. Hence, the square projection faces "Top", "Back", "Bottom", "Right", "Front", and "Back" are arranged in the compact CMP layout 204 that is a 3×2 layout. In this way, the coding efficiency can be improved.

However, in accordance with the compact CMP layout 204, it is possible that packing of square projection faces may result in image content discontinuity edges between adjacent square projection faces. As shown in FIG. 2, the projection-based frame IMG with the compact CMP layout 204 has a top sub-frame (which is one 3×1 face row consisting of square projection faces "Right", "Front" and "Left") and a bottom sub-frame (which is the other 3×1 face row consisting of square projection faces "Bottom", "Back" and "Top"). There is an image content discontinuity edge between the top sub-frame and the bottom sub-frame. Specifically, the face boundary S13 of the square projection face "Right" connects with the face boundary S62 of the square projection face "Bottom", the face boundary S23 of the square projection face "Front" connects with the face boundary S52 of the square projection face "Back", and the face boundary S33 of the square projection face "Left" connects with the face boundary S42 of the square projection face "Top", where there is image content discontinuity between face boundaries S13 and S62, there is image content discontinuity between face boundaries S23 and S52, and there is image content discontinuity between face boundaries S33 and S42.

Further, in accordance with the compact CMP layout 204, it is possible that packing of square projection faces may result in image content continuity edges between adjacent square projection faces. Regarding the top sub-frame, the face boundary S14 of the square projection face "Right" connects with the face boundary S22 of the square projection face "Front", and the face boundary S24 of the square projection face "Front" connects with the face boundary S32 of the square projection face "Left", where there is image content continuity between face boundaries S14 and S22, and there is image content continuity between face boundaries S24 and S32. Regarding the bottom sub-frame, the face boundary S61 of the square projection face "Bottom" connects with the face boundary S53 of the square projection face "Back", and the face boundary S51 of the square projection face "Back" connects with the face boundary S43 of the square projection face "Top", where there is image content continuity between face boundaries S61 and S53, and there is image content continuity between face boundaries S51 and S43.

Moreover, the compact CMP layout 204 has a top discontinuous boundary (which consists of face boundaries S11, S21, S31 of square projection faces "Right", "Front" and "Left"), a bottom discontinuous boundary (which consists of face boundaries S64, S54, S44 of square projection faces "Bottom", "Back" and "Top"), a left discontinuous boundary (which consists of face boundaries S12, S63 of square projection faces "Right" and "Bottom"), and a right discontinuous boundary (which consists of face boundaries S34, S41 of square projection faces "Left" and "Top").

In accordance with the compact CMP layout 204, the image content discontinuity edge between the top sub-frame and the bottom sub-frame includes an image content discontinuity edge between projection faces "Right" and "Bottom", an image content discontinuity edge between projection faces "Front" and "Back", and an image content discontinuity edge between projection faces "Left" and "Top". The picture quality around the image content discontinuity edge between the top sub-frame and the bottom sub-frame of the reconstructed projection-based frame R/R' will be degraded by a typical SAO filter that applies a typical SAO filtering process to pixels located on a bottom sub-frame boundary of the top sub-frame and pixels located on a top sub-frame boundary of the bottom sub-frame due to the fact that pixels on opposite side of the image content discontinuity edge between the top sub-frame and the bottom sub-frame are not 'real' neighboring pixels. In addition, a typical SAO filter disables SAO filtering of pixels located on the picture boundaries due to the fact that no neighboring pixels are available outside the picture boundaries.

To address these issues, the present invention proposes an innovative padding-based SAO filtering method that can be implemented in the encoder-side SAO filter 134 and the decoder-side SAO filter 144. When the reconstructed projection-based frame R/R' employs the compact CMP layout 204, the SAO filter 134/144 can find padding pixels needed for properly dealing with SAO filtering of pixels on a discontinuous picture boundary (e.g., S11, S21, S31, S12, S63, S64, S54, S44, S34, or S41 shown in FIG. 2) and/or a discontinuous face edge (e.g., S13, S23, S33, S62, S52, or S42 shown in FIG. 2). Further details of the proposed padding-based SAO filtering method are described below with reference to the accompanying drawings.

The SAO filter 134/144 may support two SAO types, including an edge offset (EO) mode and a band offset (BO) mode. For the BO mode, the SAO filtering process of a current pixel in a block depends on the intensity of the current pixel. For the EO mode, the SAO filtering process of a current pixel in a block depends on the relationship between the current pixel and neighboring pixels. It is possible that at least one neighboring pixel does not exist in the reconstructed projection-based frame R/R', and/or at least one neighboring pixel and the current pixel are on opposite sides of a discontinuous edge between a top sub-frame and a bottom sub-frame of the reconstructed projection-based frame R/R'. Hence, the padding-based SAO filtering method focuses on the EO mode. In the following, it is assumed that a block is filtered under a condition that an SAO type selected for the block is an EO mode.

In some embodiments of the present invention, the video encoder 116 may be configured to have two working buffers 140 that act as sub-frame buffers, where one sub-frame buffer is used to store a top sub-frame of the reconstructed projection-based frame R with the compact CMP layout 204 and padding areas extended from sub-frame boundaries of the top sub-frame, and the other sub-frame buffer is used to store a bottom sub-frame of the reconstructed projection-based frame R with the compact CMP layout 204 and padding areas extended from sub-frame boundaries of the bottom sub-frame. Similarly, the video decoder 122 may be configured to have two working buffers 150 that act as sub-frame buffers, where one sub-frame buffer is used to store a top sub-frame of the reconstructed projection-based frame R' with the compact CMP layout 204 and padding areas extended from sub-frame boundaries of the top sub-frame, and the other sub-frame buffer is used to store a bottom sub-frame of the reconstructed projection-based frame R' with the compact CMP layout 204 and padding areas extended from sub-frame boundaries of the bottom sub-frame. The SAO filter 134/144 finds padding pixels in padding areas that surround the top sub-frame and the bottom sub-frame, and performs an SAO filtering process according to reconstructed frame data and padding pixel data stored in the sub-frame buffers.

Figure 3:
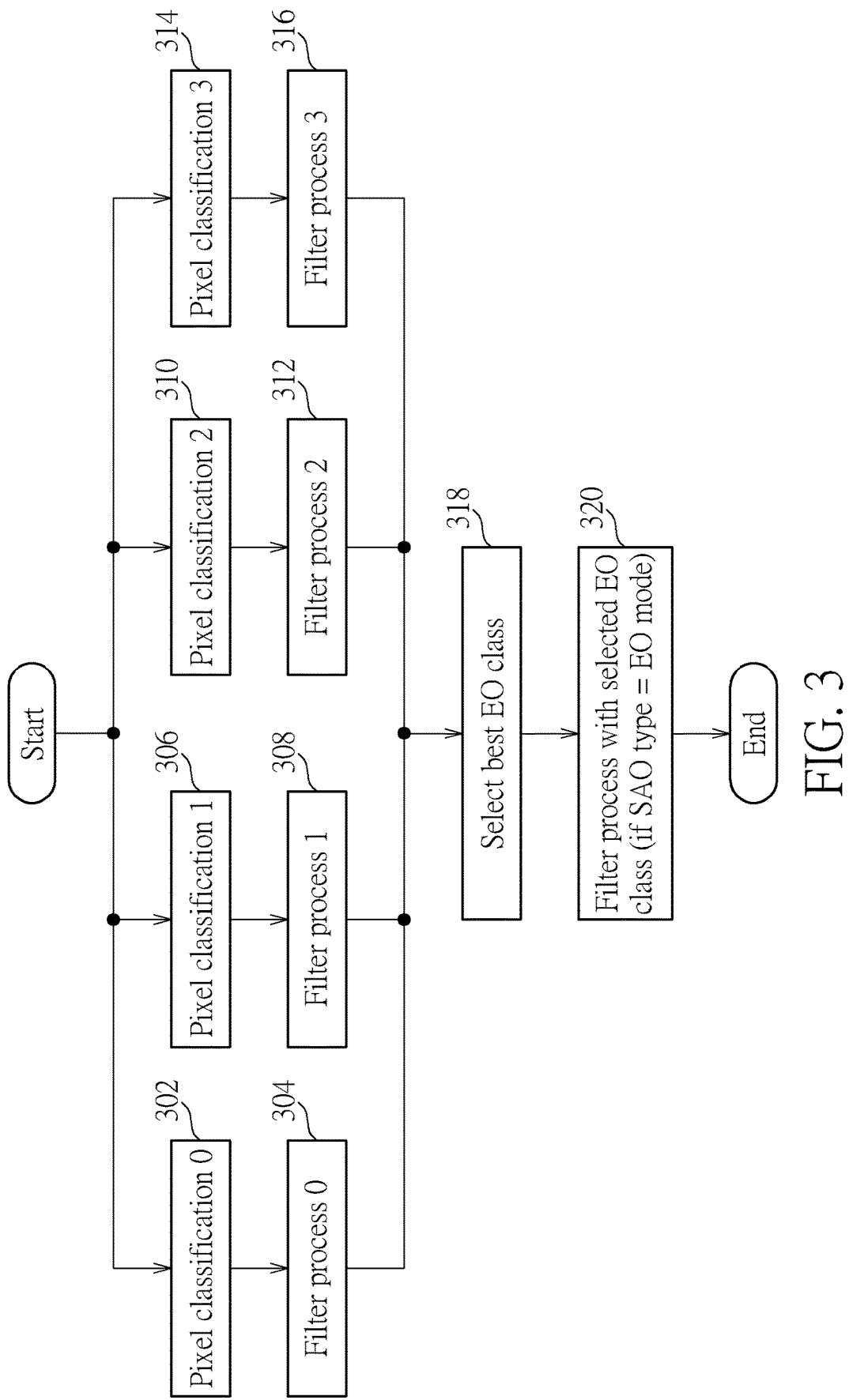
FIG. 3 is a flowchart illustrating an SAO filtering method that is applied to a block included in a reconstructed projection-based frame generated at a video encoder according to an embodiment of the present invention.
Figure 4:
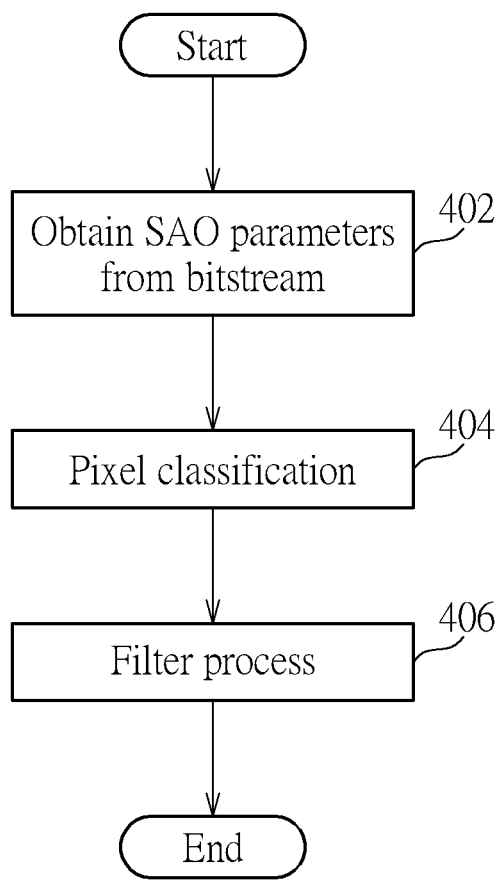
FIG. 4 is a flowchart illustrating an SAO filtering method that is applied to a block included in a reconstructed projection-based frame generated at a video decoder according to an embodiment of the present invention.

FIG. 3 is a flowchart illustrating an SAO filtering method that is applied to a block included in the reconstructed projection-based frame R generated at the video encoder 116 according to an embodiment of the present invention. FIG. 4 is a flowchart illustrating an SAO filtering method that is applied to a block included in the reconstructed projection-based frame R' generated at the video decoder 122 according to an embodiment of the present invention. It should be noted that padding pixels are involved in the SAO filtering processes shown in FIG. 3 and FIG. 4.

Regarding the EO mode, several pixel classification methods may be supported by the SAO filter 134/144. By way of example, but not limitation, the SAO filter 134/144 may be configured to support four EO classes. As for the SAO filtering method shown in FIG. 3, pixel classification methods for four EO classes are performed at steps 302, 306, 310, and 314, respectively. As for the SAO filtering method shown in FIG. 4, a pixel classification method for a selected EO class is performed at step 404. Since information of an EO class selected at the encoder side is signaled to the video decoder 122 via the bitstream BS, it is obtained by the video decoder 122 through decoding the bitstream BS (step 402), and then the SAO filter 144 is informed of the selected EO class (step 404). In one pixel classification method, each pixel in one block (e.g., each luma sample in one luma CTB, or each chroma sample in one chroma CTB) is classified into one of a plurality of pre-defined categories.

Figure 5:
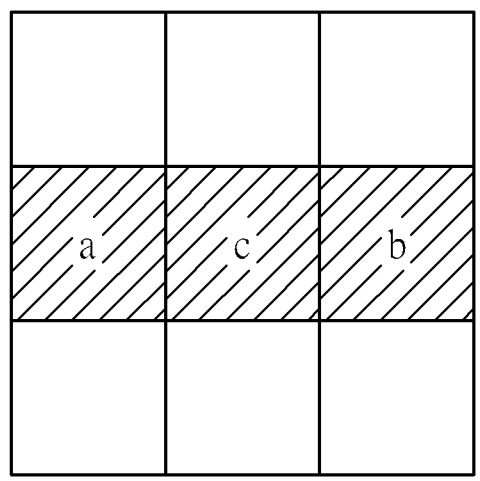
FIG. 5 is a diagram illustrating a horizontal pattern used by a pixel classification method (EO class=0).

At step 302, a pixel classification method (EO class=0) is performed according to a horizontal pattern. At step 404, a pixel classification method is performed according to a horizontal pattern under a condition that EO class=0. FIG. 5 is a diagram illustrating a horizontal pattern used by a pixel classification method (EO class=0). A pixel value of a current pixel is labeled by "c". Pixel values of neighboring pixels are labeled by "a" and "b", respectively. For example, the current pixel may be classified into one of five categories according to following classification rules. In accordance with the padding-based SAO filtering method, at least one neighboring pixel in the horizontal pattern may be a padding pixel.

| Category | Condition |
| --- | --- |
| 1 | c < a && c < b |
| 2 | (c < a && c==b) \|\| (c==a && c < b) |
| 3 | (c > a && c==b) \|\| (c==a && c > b) |
| 4 | c > a && c > b |
| 0 | None of the above |

Figure 6:
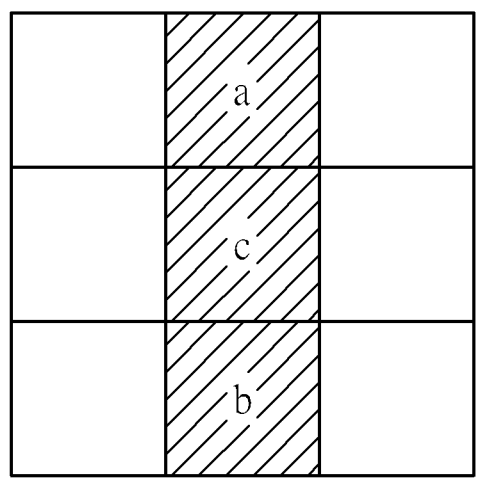
FIG. 6 is a diagram illustrating a vertical pattern used by a pixel classification method (EO class=1).

At step 306, a pixel classification method (EO class=1) is performed according to a vertical pattern. At step 404, a pixel classification method is performed according to a horizontal pattern under a condition that EO class=1. FIG. 6 is a diagram illustrating a vertical pattern used by a pixel classification method (EO class=1). A pixel value of a current pixel is labeled by "c". Pixel values of neighboring pixels are labeled by "a" and "b", respectively. For example, the current pixel may be classified into one of five categories according to above classification rules. In accordance with the padding-based SAO filtering method, at least one neighboring pixel in the vertical pattern may be a padding pixel.

Figure 7:
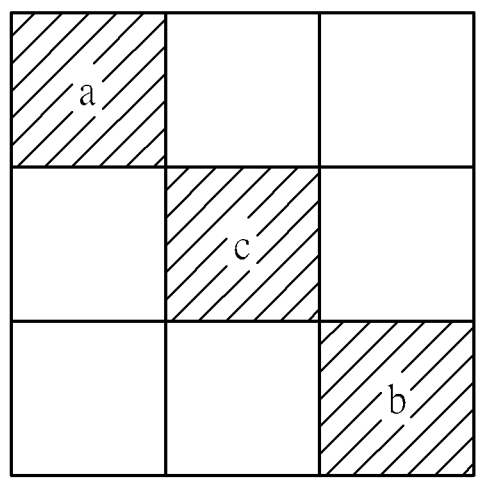
FIG. 7 is a diagram illustrating a 135-degree diagonal pattern used by a pixel classification method (EO class=2).

At step 310, a pixel classification method (EO class=2) is performed according to a 135-degree diagonal pattern. At step 404, a pixel classification method is performed according to a 135-degree diagonal pattern under a condition that EO class=2. FIG. 7 is a diagram illustrating a 135-degree diagonal pattern used by a pixel classification method (EO class=2). A pixel value of a current pixel is labeled by "c". Pixel values of neighboring pixels are labeled by "a" and "b", respectively. For example, the current pixel may be classified into one of five categories according to above classification rules. In accordance with the padding-based SAO filtering method, at least one neighboring pixel in the 135-degree diagonal pattern may be a padding pixel.

Figure 8:
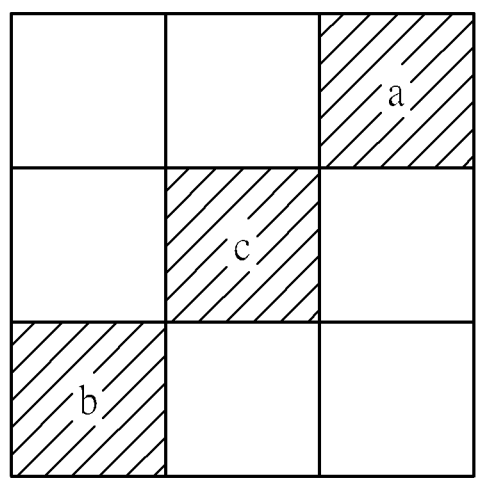
FIG. 8 is a diagram illustrating a 45-degree diagonal pattern used by a pixel classification method (EO class=3).

At step 314, a pixel classification method (EO class=3) is performed according to a 45-degree diagonal pattern. At step 404, a pixel classification method is performed according to a 45-degree diagonal pattern under a condition that EO class=3. FIG. 8 is a diagram illustrating a 45-degree diagonal pattern used by a pixel classification method (EO class=3). A pixel value of a current pixel is labeled by "c". Pixel values of neighboring pixels are labeled by "a" and "b", respectively. For example, the current pixel may be classified into one of five categories according to above classification rules. In accordance with the padding-based SAO filtering method, at least one neighboring pixel in the 45-degree diagonal pattern may be a padding pixel.

Categories 1 and 4 are associated with a local valley and a local peak along the selected pattern, respectively. Categories 2 and 3 are associated with concave and convex corners along the selected pattern, respectively. If the current pixel does not belong to EO categories 1-4, then it is category 0 and SAO filtering is not applied to the current pixel. In this embodiment, an offset of each of categories 1-4 for a given EO class is properly calculated at the encoder-side SAO filter 134 and explicitly signaled to the decoder-side SAO filter 144 for reducing the sample distortion effectively, while the classification of each pixel is performed at both the encoder-side SAO filter 134 and the decoder-side SAO filter 144 for saving side information significantly. However, this is for illustrative purposes only, and is not meant to be a limitation of the present invention. Any SAO filter that applies the proposed padding-based SAO filtering to a reconstructed projection-based frame falls within the scope of the present invention.

The encoder-side SAO filter 134 may perform filter processes, each being used for calculating offsets of categories 1-4 for a given EO class. At step 304, candidate offsets of category 1 for EO class 0 are applied to pixels in a block that are classified into the same category 1, and a best offset of category 1 for EO class 0 is selected from the candidate offsets according to rate-distortion optimization (RDO); candidate offsets of category 2 for EO class 0 are applied to pixels in the block that are classified into the same category 2, and a best offset of category 2 for EO class 0 is selected from the candidate offsets according to RDO; candidate offsets of category 3 for EO class 0 are applied to pixels in the block that are classified into the same category 3, and a best offset of category 3 for EO class 0 is selected from the candidate offsets according to RDO; and candidate offsets of category 4 for EO class 0 are applied to pixels in the block that are classified into the same category 4, and a best offset of category 4 for EO class 0 is selected from the candidate offsets according to RDO. In accordance with the padding-based SAO filtering method, one or more pixels involved in finding an offset of each of categories 1-4 for EO class 0 may be padding pixels.

At step 308, candidate offsets of category 1 for EO class 1 are applied to pixels in a block that are classified into the same category 1, and a best offset of category 1 for EO class 1 is selected from the candidate offsets according to RDO; candidate offsets of category 2 for EO class 1 are applied to pixels in the block that are classified into the same category 2, and a best offset of category 2 for EO class 1 is selected from the candidate offsets according to RDO; candidate offsets of category 3 for EO class 1 are applied to pixels in the block that are classified into the same category 3, and a best offset of category 3 for EO class 1 is selected from the candidate offsets according to RDO; and candidate offsets of category 4 for EO class 1 are applied to pixels in the block that are classified into the same category 4, and a best offset of category 4 for EO class 1 is selected from the candidate offsets according to RDO. In accordance with the padding-based SAO filtering method, one or more pixels involved in finding an offset of each of categories 1-4 for EO class 1 may be padding pixels.

At step 312, candidate offsets of category 1 for EO class 2 are applied to pixels in a block that are classified into the same category 1, and a best offset of category 1 for EO class 2 is selected from the candidate offsets according to RDO; candidate offsets of category 2 for EO class 2 are applied to pixels in the block that are classified into the same category 2, and a best offset of category 2 for EO class 2 is selected from the candidate offsets according to RDO; candidate offsets of category 3 for EO class 2 are applied to pixels in the block that are classified into the same category 3, and a best offset of category 3 for EO class 2 is selected from the candidate offsets according to RDO; and candidate offsets of category 4 for EO class 2 are applied to pixels in the block that are classified into the same category 4, and a best offset of category 4 for EO class 2 is selected from the candidate offsets according to RDO. In accordance with the padding-based SAO filtering method, one or more pixels involved in finding an offset of each of categories 1-4 for EO class 2 may be padding pixels.

At step 316, candidate offsets of category 1 for EO class 3 are applied to pixels in a block that are classified into the same category 1, and a best offset of category 1 for EO class 3 is selected from the candidate offsets according to RDO; candidate offsets of category 2 for EO class 3 are applied to pixels in the block that are classified into the same category 2, and a best offset of category 2 for EO class 3 is selected from the candidate offsets according to RDO; candidate offsets of category 3 for EO class 3 are applied to pixels in the block that are classified into the same category 3, and a best offset of category 3 for EO class 3 is selected from the candidate offsets according to RDO; and candidate offsets of category 4 for EO class 3 are applied to pixels in the block that are classified into the same category 4, and a best offset of category 4 for EO class 3 is selected from the candidate offsets according to RDO. In accordance with the padding-based SAO filtering method, one or more pixels involved in finding an offset of each of categories 1-4 for EO class 3 may be padding pixels.

At step 318, a best EO class for the block is selected from four EO classes 0-3 according to RDO. At step 320, a filter process is actually applied to each pixel in the block, thereby updating a value of the pixel in the reconstructed projection-based frame R.

Information of an EO class selected for a block and information of offsets selected for categories of the EO class may be signaled from the video encoder 116 to the video decoder 122. Specifically, SAO parameters encoded in the bitstream BS contain SAO type information and offset information for the block that is SAO filtered using an EO mode. The SAO type information includes one syntax element indicating that an SAO type is an EO mode and another syntax element indicative of the selected EO class. The offset information includes syntax elements that indicate offsets of categories 1-4 for the selected EO class. Hence, the video decoder 122 obtains SAO parameters of the block from decoding the bitstream BS. After a pixel in the block of the reconstructed projection-based frame R' is classified into one of categories 1-4 for the selected EO class that is indicated by the SAO type information derived from decoding the bitstream BS, the SAO filter 144 adds an offset of the EO category into which the pixel is classified to a value of the pixel (step 406), where the offset of the EO category is indicated by the offset information derived from decoding the bitstream BS.

As mentioned above, a pixel classification process (step 302, 306, 310, 314, or 404) requires multiple pixels for EO category classification of one pixel, and a filter process (step 304, 308, 312, or 314) requires multiple pixels for offset determination of one EO category. In accordance with the proposed padding-based SAO filtering method that is applied to pixels near discontinuous picture boundaries and/or discontinuous face edges, at least one of the pixels required by EO category classification of one pixel (or required by offset determination of one EO category) is a padding pixel found by the SAO filter 134/144.

Figure 9:
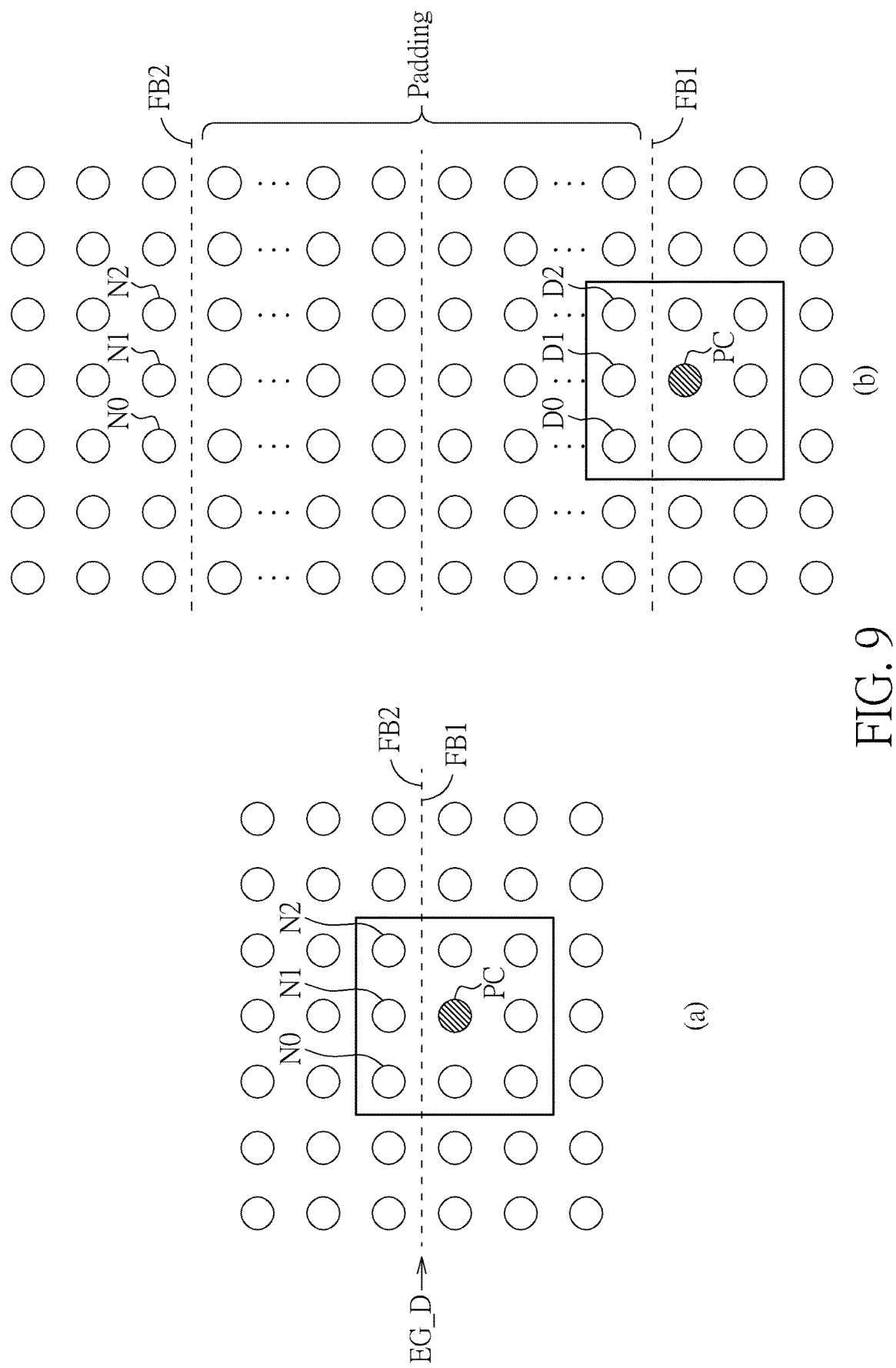
FIG. 9 is a diagram illustrating a padding-based SAO filtering concept according to an embodiment of the present invention.

FIG. 9 is a diagram illustrating a padding-based SAO filtering concept according to an embodiment of the present invention. As shown in the sub-diagram (a) of FIG. 9, a current pixel PC to be classified is located on a face boundary FB1 of a first projection face. Consider a case where the face boundary FB1 of the first projection face connects with a face boundary FB2 of a second projection face in a reconstructed projection-based frame, and an edge EG_D between face boundaries FB1 and FB2 is an image content discontinuity edge (i.e., discontinuous face edge). For example, the face boundaries FB1 and FB2 are S62 and S13 shown in FIG. 2, or S52 and S23 shown in FIG. 2, or S42 and S33 shown in FIG. 2. Hence, neighboring pixels N0, N1, and N2 of the current pixel PC are not 'real' neighboring pixels due to discontinuous projection faces. If the non-real neighboring pixels N0, N1, and N2 are used by EO category classification of the current pixel PC, SAO filtering of the current pixel PC may suffer from an incorrect classification result as well as an incorrect offset calculation/selection.

As shown in the sub-diagram (b) of FIG. 9, padding is applied to the face boundary FB1 on which the current pixel PC is located. Hence, non-real neighboring pixels N0, N1, and N2 are not used by EO category classification of the current pixel PC. Instead, padding pixels D0, D1, and D3 take the place of the non-real neighboring pixels N0, N1, and N2, and are used by EO category classification of the current pixel PC. With proper settings of padding pixels D0, D1, and D3, a more accurate classification result of the current pixel PC can be obtained by the SAO filter 134/144. In this way, a more accurate offset can be calculated/selected for the current pixel PC.

Consider another case where the face boundary FB1 of the first projection face is a part of one picture boundary of a reconstructed projection-based frame. Hence, the reconstructed projection-based frame has no pixel outside the edge EG_D. In other words, neighboring pixels N0, N1, and N2 shown in sub-diagram (a) of FIG. 9 are not available to EO category classification of the current pixel PC. As shown in the sub-diagram (b) of FIG. 9, padding is applied to the face boundary FB1 on which the current pixel PC is located. Hence, padding pixels D0, D1, and D3 are created to act as neighboring pixels needed by EO category classification of the current pixel PC. With proper settings of padding pixels D0, D1, and D3, an SAO filtering process is allowed to be applied to the current pixel PC located on the picture boundary.

The same concept can be applied to a filter process which is used for calculating an offset of one category for a given EO class. For example, padding pixels may be created to take the place of some reconstructed pixels (e.g., non-real neighboring pixels) originally available in a block (e.g., CTB) to be SAO filtered. Hence, a block (e.g., CTB) that undergoes SAO filtering may include reconstructed pixels (which are originally available in the block) and padding pixels (which are extended from at least one face boundary).

In other words, padding pixels are involved in offset determination for a given EO class.

As mentioned above, two working buffers (e.g., working buffers 140 at the encoder side or working buffers 150 at the decoder side) can be used to act as sub-frame buffers, where one sub-frame buffer is used to store a top sub-frame of the reconstructed projection-based frame R/R' with the compact CMP layout 204 and padding areas extended from sub-frame boundaries of the top sub-frame, and the other sub-frame buffer is used to store a bottom sub-frame of the reconstructed projection-based frame R/R' with the compact CMP layout 204 and padding areas extended from sub-frame boundaries of the bottom sub-frame. Hence, either of pixel classification (steps 302, 306, 310, 314, and 404) and filter process (steps 304, 308, 312, and 316) can read required padding pixel(s) from the sub-frame buffers.

Figure 10:
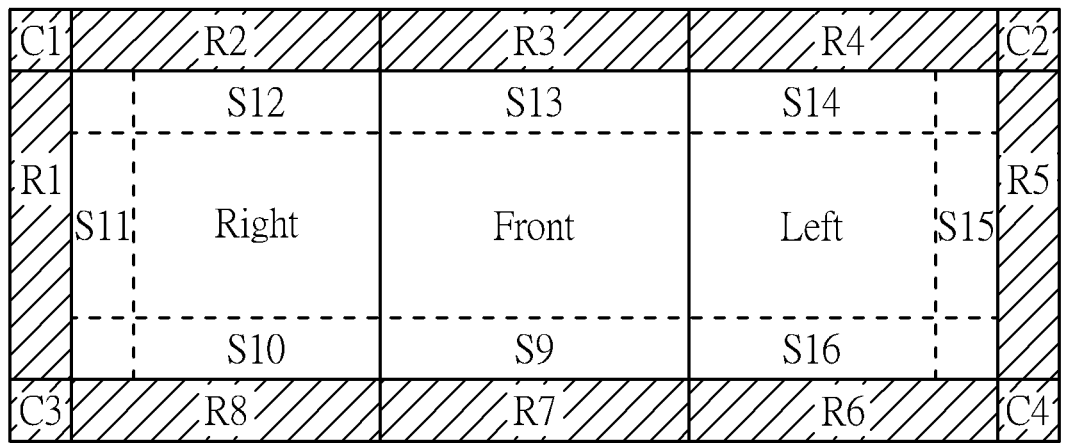
FIG. 10 is a diagram illustrating one arrangement of reconstructed frame data and padding pixel data stored in working buffers of an SAO filter according to an embodiment of the present invention.
Figure 10:
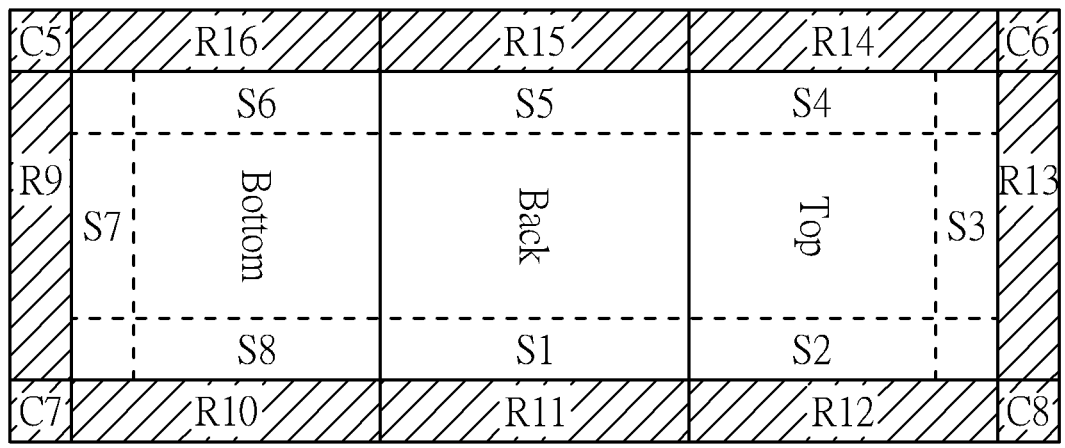

FIG. 10 is a diagram illustrating one arrangement of reconstructed frame data and padding pixel data stored in working buffers 140/150 of SAO filter 134/144 according to an embodiment of the present invention. Suppose that the reconstructed projection-based frame R/R' employs the compact CMP layout 204. Hence, the top sub-frame includes the square projection faces "Right", "Front", and "Left", and the bottom sub-frame includes the square projection faces "Top", "Back", and "Bottom". As mentioned above, there is an image content discontinuity edge between a bottom sub-frame boundary of the top sub-frame and a top sub-frame boundary of the bottom sub-frame. In addition, the reconstructed projection-based frame R/R' has discontinuous picture boundaries, where a top picture boundary is also a top sub-frame boundary of the top sub-frame, a bottom picture boundary is also a bottom sub-frame boundary of the bottom sub-frame, a left picture boundary includes a left sub-frame boundary of the top sub-frame and a left sub-frame boundary of the bottom sub-frame, and a right picture boundary includes a right sub-frame boundary of the top sub-frame and a right sub-frame boundary of the bottom sub-frame. In accordance with the padding-based SAO filtering method, padding pixels are appended to all sub-frame boundaries of the top sub-frame and the bottom sub-frame.

As shown in FIG. 10, one working buffer 140/150 may act as a sub-frame buffer used to store the top sub-frame (which includes square projection faces "Right", "Front", and "Left") and associated padding pixels (which are included in a plurality of padding areas R1-R8 and C1-C4 extended from sub-frame boundaries of the top sub-frame); and another working buffer 140/150 may act as a sub-frame used to store the bottom sub-frame (which includes square projection faces "Top", "Back", and "Bottom") and associated padding pixels (which are included in a plurality of padding areas R9-R16 and C5-C8 extended from sub-frame boundaries of the bottom sub-frame).

Figure 11:
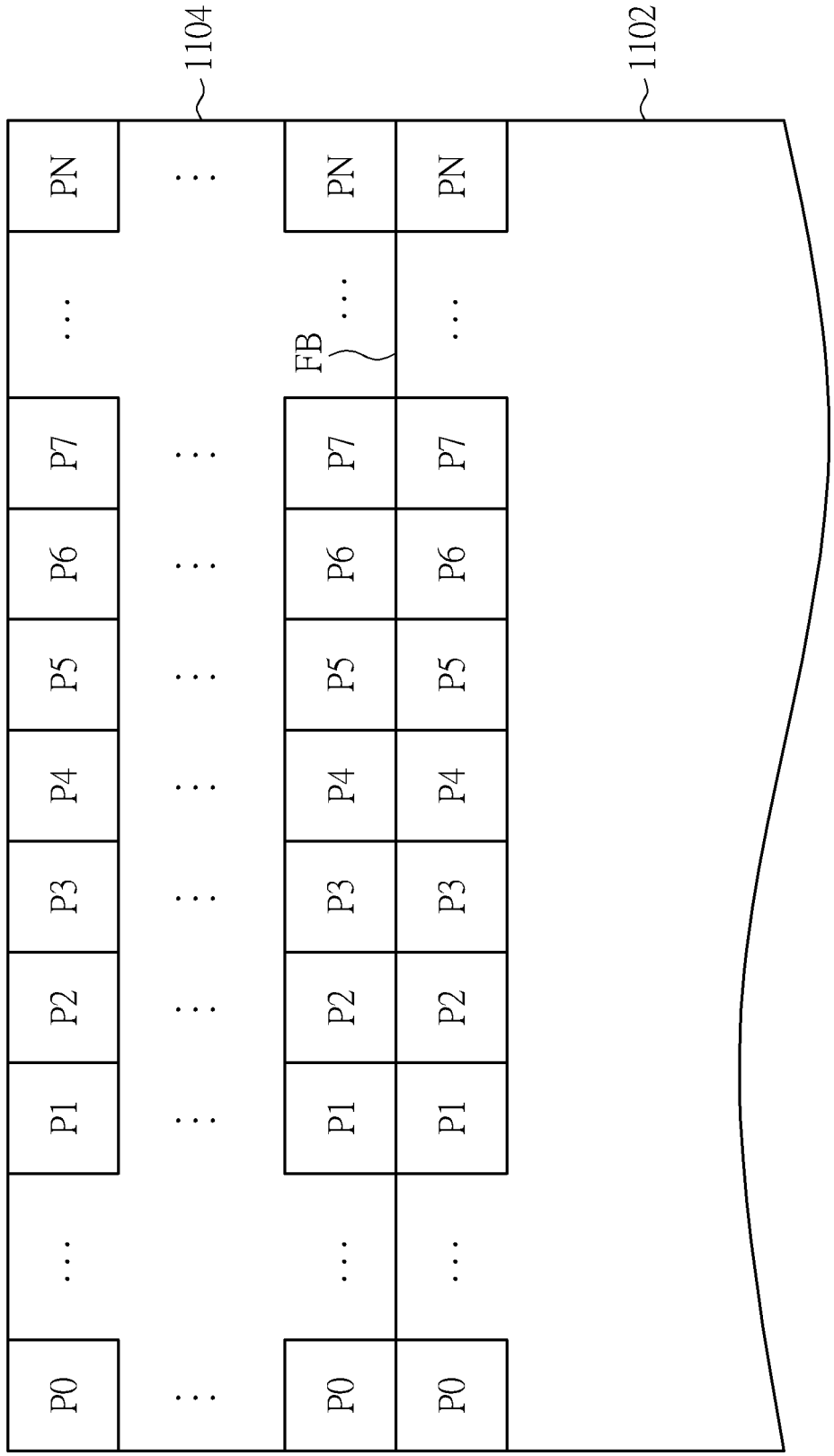
FIG. 11 is a diagram illustrating padding pixels that are found by repeating edge pixels according to an embodiment of the present invention.

In a first padding design, padding pixels can be found by an edge pixel duplication scheme. In accordance with the edge pixel duplication scheme, padding pixels can be obtained by directly replicating edge pixels, including pixels located on picture boundaries of the reconstructed projection-based frame R/R', pixels located on the bottom sub-frame boundary of the top sub-frame, and pixels located on the top sub-frame boundary of the bottom sub-frame. FIG. 11 is a diagram illustrating padding pixels that are found by repeating edge pixels according to an embodiment of the present invention. A padding area 1104 is extended from a face boundary FB of a projection face 1102. For example, the face boundary FB may be one of the face boundaries S11, S21, S31, S12, S13, S23, S33, S34, S63, S64, S54, S44, and S41 shown in FIG. 2. There are edge pixels P0-PN located on the face boundary FB. The padding area 1104 is extended from the face boundary FB by repeating the edge pixels P0-PN.

In a second padding design, padding pixels in a padding area extended from a face boundary of a projection face can be set by spherical neighboring pixels, where a region on the sphere 200 to which the padding area corresponds is adjacent to a region on the sphere 200 from which the projection face is obtained. For example, spherical neighboring pixels can be found by using a face based scheme or a geometry based scheme.

In accordance with the face based scheme, a spherical neighboring pixel is directly set by a copy of a pixel in a projection face packed in a reconstructed frame. In a case where there are multiple projection faces packed in a projection layout, a spherical neighboring pixel is found in another projection face different from one projection face at which a current pixel to be SAO filtered is located. In another case where there is only a single projection face packed in a projection layout, a spherical neighboring pixel is found in the same projection face at which a current pixel to be SAO filtered is located.

Figure 12:
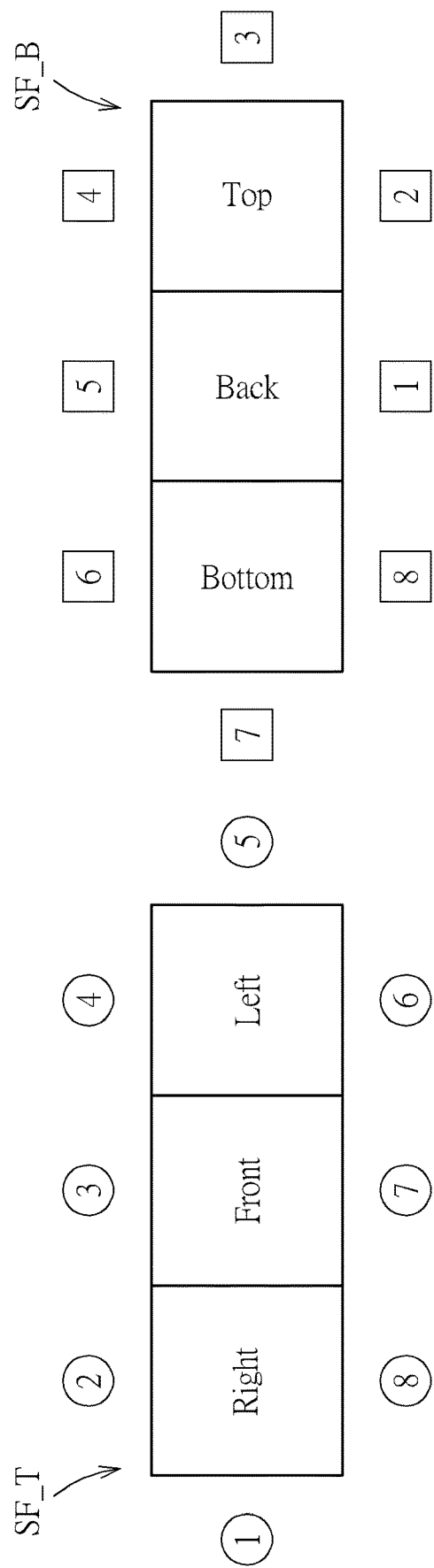
FIG. 12 is a diagram illustrating image content continuity relations among square projection faces packed in a compact cubemap projection layout.

FIG. 12 is a diagram illustrating image content continuity relations among square projection faces packed in the compact CMP layout 204. The top sub-frame SF_T of the reconstructed projection-based frame R/R' includes square projection faces "Right", "Front", and "Left". The bottom sub-frame SF_B of the reconstructed projection-based frame R/R' includes square projection faces "Top", "Back", and "Bottom". There is image content continuity between face boundaries marked by the same reference numeral. Taking the square projection face "Top" in the bottom sub-frame SF_B for example, a real adjacent projection face in the top sub-frame SF_T that is adjacent to the face boundary marked by "4" is the square projection face "Left", a real adjacent projection face in the top sub-frame SF_T that is adjacent to the face boundary marked by "3" is the square projection face "Front", and a real adjacent projection face in the top sub-frame SF T that is adjacent to the face boundary marked by "2" is the square projection face "Right". Regarding SAO filtering of pixels that are included in the square projection face "Top" and are near the face boundary marked by "4", spherical neighboring pixels (which are padding pixels required by SAO filtering) can be found from the square projection face "Left" by copying pixels that are included in the square projection face "Left" and are near the face boundary marked by "4". Regarding SAO filtering of pixels that are included in the square projection face "Top" and are near the face boundary marked by "3", spherical neighboring pixels (which are padding pixels required by SAO filtering) can be found from the square projection face "Front" by copying pixels that are included in the square projection face "Front" and are near the face boundary marked by "3". Regarding SAO filtering of pixels that are included in the square projection face "Top" and are near the face boundary marked by "2", spherical neighboring pixels (which are padding pixels required by SAO filtering) can be found from the square projection face "Right" by copying pixels that are included in the square projection face "Right" and are near the face boundary marked by "2".

Please refer to FIG. 10 in conjunction with FIG. 12. The padding area R1 extended from the left face boundary of the square projection face "Right" is obtained by copying an image area S1 of the square projection face "Back" and then properly rotating a copied image area, where a region on the sphere 200 to which the padding area R1 corresponds is adjacent to a region on the sphere 200 from which the square projection face "Right" is obtained. The padding area R2 extended from the top face boundary of the square projection face "Right" is obtained by copying an image area S2 of the square projection face "Top", where a region on the sphere 200 to which the padding area R2 corresponds is adjacent to a region on the sphere 200 from which the square projection face "Right" is obtained. The padding area R3 extended from the top face boundary of the square projection face "Front" is obtained by copying an image area S3 of the square projection face "Top" and then properly rotating a copied image area, where a region on the sphere 200 to which the padding area R3 corresponds is adjacent to a region on the sphere 200 from which the square projection face "Front" is obtained. The padding area R4 extended from the top face boundary of the square projection face "Left" is obtained by copying an image area S4 of the square projection face "Top" and then properly rotating a copied image area, where a region on the sphere 200 to which the padding area R4 corresponds is adjacent to a region on the sphere 200 from which the square projection face "Left" is obtained.

The padding area R5 extended from the right face boundary of the square projection face "Left" is obtained by copying an image area S5 of the square projection face "Back" and then properly rotating a copied image area, where a region on the sphere 200 to which the padding area R5 corresponds is adjacent to a region on the sphere 200 from which the square projection face "Left" is obtained. The padding area R6 extended from the bottom face boundary of the square projection face "Left" is obtained by copying an image area S6 of the square projection face "Bottom", where a region on the sphere 200 to which the padding area R6 corresponds is adjacent to a region on the sphere 200 from which the square projection face "Left" is obtained. The padding area R7 extended from the bottom face boundary of the square projection face "Front" is obtained by copying an image area S7 of the square projection face "Bottom" and then properly rotating a copied image area, where a region on the sphere 200 to which the padding area R7 corresponds is adjacent to a region on the sphere 200 from which the square projection face "Front" is obtained. The padding area R8 extended from the bottom face boundary of the square projection face "Right" is obtained by copying an image area S8 of the square projection face "Bottom" and then properly rotating a copied image area, where a region on the sphere 200 to which the padding area R8 corresponds is adjacent to a region on the sphere 200 from which the square projection face "Right" is obtained.

The padding area R9 extended from the left face boundary of the square projection face "Bottom" is obtained by copying an image area S9 of the square projection face "Front" and then properly rotating a copied image area, where a region on the sphere 200 to which the padding area R9 corresponds is adjacent to a region on the sphere 200 from which the square projection face "Bottom" is obtained. The padding area R10 extended from the bottom face boundary of the square projection face "Bottom" is obtained by copying an image area S10 of the square projection face "Right" and then properly rotating a copied image area, where a region on the sphere 200 to which the padding area R10 corresponds is adjacent to a region on the sphere 200 from which the square projection face "Bottom" is obtained. The padding area R11 extended from the bottom face boundary of the square projection face "Back" is obtained by copying an image area S11 of the square projection face "Right" and then properly rotating a copied image area, where a region on the sphere 200 to which the padding area R11 corresponds is adjacent to a region on the sphere 200 from which the square projection face "Back" is obtained. The padding area R12 extended from the bottom face boundary of the square projection face "Top" is obtained by copying an image area S12 of the square projection face "Right", where a region on the sphere 200 to which the padding area R12 corresponds is adjacent to a region on the sphere 200 from which the square projection face "Top" is obtained.

The padding area R13 extended from the right face boundary of the square projection face "Top" is obtained by copying an image area S13 of the square projection face "Front" and then properly rotating a copied image area, where a region on the sphere 200 to which the padding area R13 corresponds is adjacent to a region on the sphere 200 from which the square projection face "Top" is obtained. The padding area R14 extended from the top face boundary of the square projection face "Top" is obtained by copying an image area S14 of the square projection face "Left, and then properly rotating a copied image area, where a region on the sphere 200 to which the padding area R14 corresponds is adjacent to a region on the sphere 200 from which the square projection face "Top" is obtained. The padding area R15 extended from the top face boundary of the square projection face "Back" is obtained by copying an image area S15 of the square projection face "Left" and then properly rotating a copied image area, where a region on the sphere 200 to which the padding area R15 corresponds is adjacent to a region on the sphere 200 from which the square projection face "Back" is obtained. The padding area R16 extended from the top face boundary of the square projection face "Bottom" is obtained by copying an image area S16 of the square projection face "Left", where a region on the sphere 200 to which the padding area R16 corresponds is adjacent to a region on the sphere 200 from which the square projection face "Bottom" is obtained.

Regarding the padding areas C1-C4, they may be generated by repeating four corner pixels of the top sub-frame. Specifically, padding pixels in the padding area C1 are generated by repeating a leftmost pixel at a topmost row of the square projection face "Right", padding pixels in the padding area C2 are generated by repeating a rightmost pixel at a topmost row of the square projection face "Left", padding pixels in the padding area C3 are generated by repeating a leftmost pixel at a bottommost row of the square projection face "Right", and padding pixels in the padding area C4 are generated by repeating a rightmost pixel at a bottommost row of the square projection face "Left".

Regarding the padding areas C5-C8, they may be generated by repeating four corner pixels of the bottom sub-frame. Specifically, padding pixels in the padding area C5 are generated by repeating a leftmost pixel at a topmost row of the square projection face "Bottom", padding pixels in the padding area C6 are generated by repeating a rightmost pixel at a topmost row of the square projection face "Top", padding pixels in the padding area C7 are generated by repeating a leftmost pixel at a bottommost row of the square projection face "Bottom", and padding pixels in the padding area C8 are generated by repeating a rightmost pixel at a bottommost row of the square projection face "Top".

Alternatively, spherical neighboring pixels can be found by using the geometry based scheme. In accordance with the geometry based scheme, spherical neighboring pixel(s) included in a padding area can be found by 3D projection. In a case where there are multiple projection faces packed in a projection layout, the geometry based scheme applies geometry mapping to projected pixel (s) on an extended area of a projection face to find point (s) on another projection face, and derives spherical neighboring pixel(s) from the point(s). In another case where there is only a single projection face packed in a projection layout, the geometry based scheme applies geometry mapping to projected pixel(s) on an extended area of a projection face to find point(s) on the same projection face, and derives spherical neighboring pixel(s) from the point(s).

Figure 13:
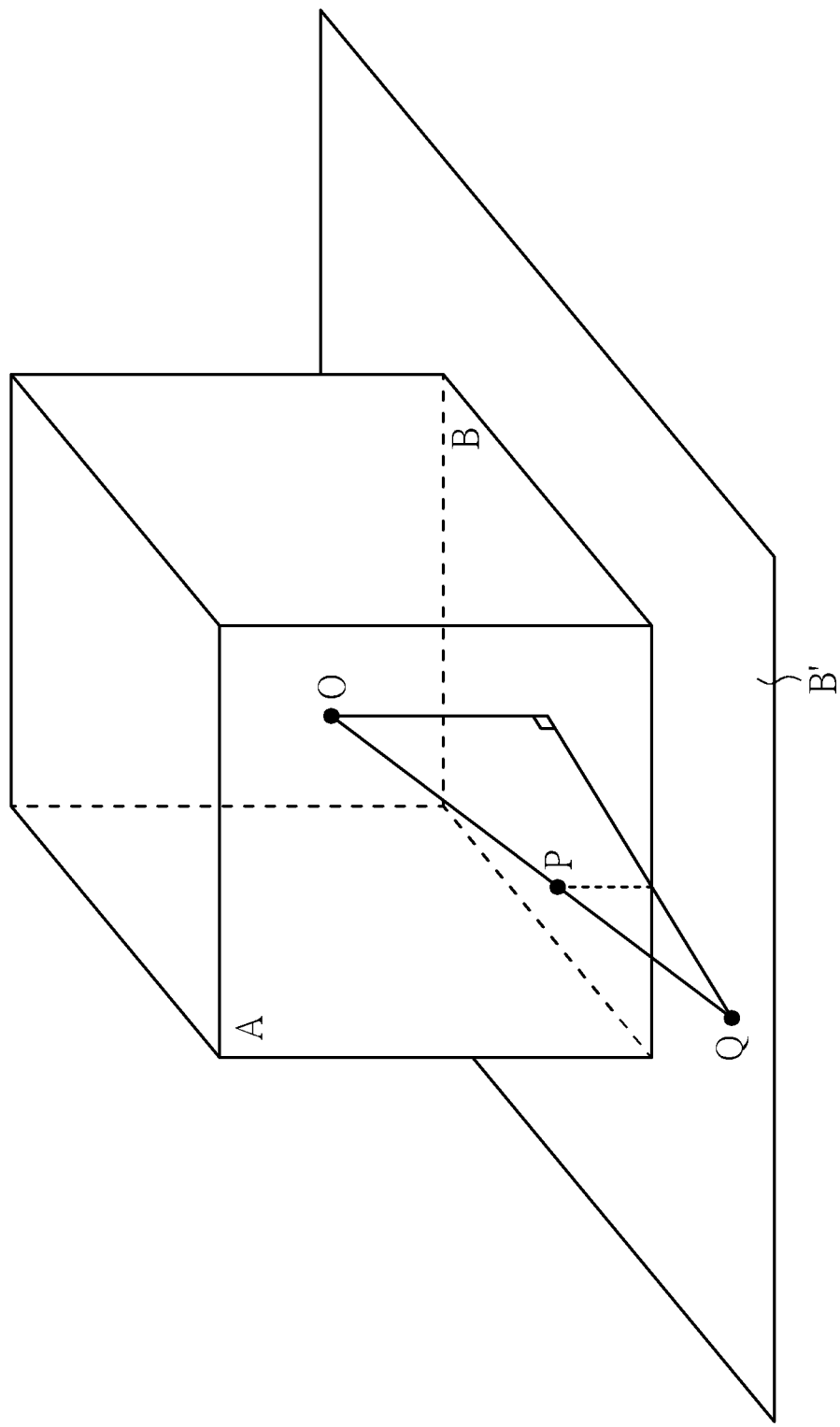
FIG. 13 is a diagram illustrating a spherical neighboring pixel found by a geometry based scheme according to an embodiment of the present invention.
Figure 14:
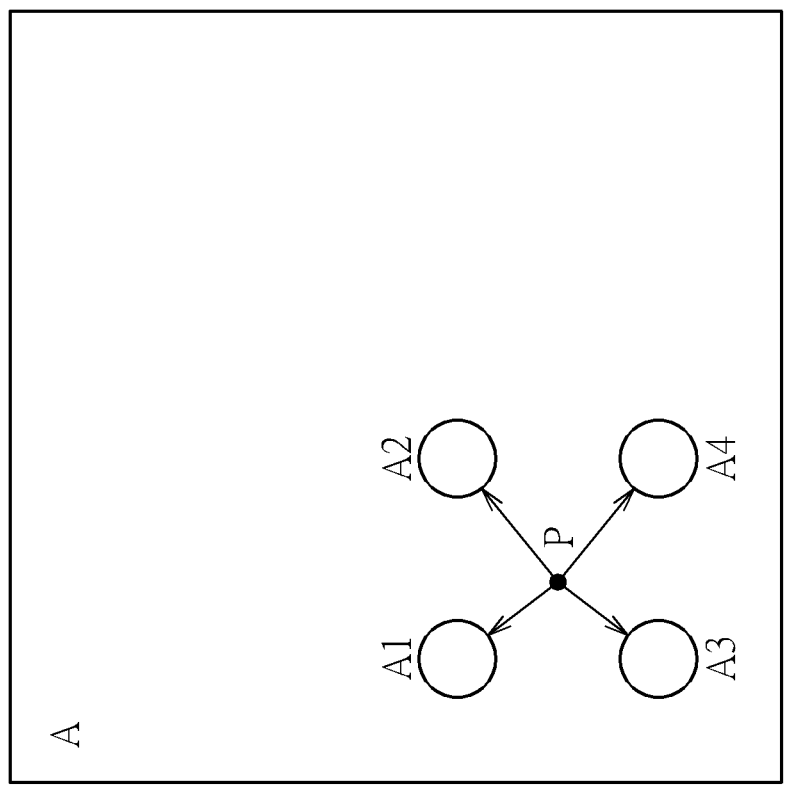
FIG. 14 is a diagram illustrating an example of generating an interpolated pixel value for a point according to an embodiment of the present invention.

FIG. 13 is a diagram illustrating a spherical neighboring pixel found by a geometry based scheme according to an embodiment of the present invention. One padding area is needed to be generated for a face B (e.g., bottom face of cube 201). To determine a pixel value of a projected pixel (which is a spherical neighboring pixel) Q on an extended area B' of the face B, a point P on a face A (e.g., front face of cube 201) is found. As shown in FIG. 13, the point P is an intersection point of the face A and a straight line $\overline{OQ}$ (which is from a projection center O (e.g., a center of the sphere 200) to the projected pixel Q). The pixel value of the point P is used for setting the pixel value of the projected pixel Q. In a case where the point P is an integer-position pixel of the face A, the pixel value of the projected pixel Q is directly set by the pixel value of the integer-position pixel. In another case where the point P is not an integer-position pixel of the face A, interpolation is performed to determine the pixel value of the point P. FIG. 14 is a diagram illustrating an example of generating an interpolated pixel value for the point P according to an embodiment of the present invention. In this example, pixel values of four nearest integer-position pixels A1, A2, A3, and A4 in the proximity of the point P are blended by interpolation for generating an interpolated pixel value to act as the pixel value of the point P. Hence, the pixel value of the projected pixel Q is set by the interpolated pixel value of the point P. However, this interpolation design is for illustrative purposes only, and is not meant to be a limitation of the present invention. In practice, an interpolation filter used by the geometry based scheme may be a nearest neighbor filter, a bilinear filter, a bicubic filter, or Lanczos filter, depending upon the actual design considerations.

Hence, spherical neighboring pixels in the padding areas R1-R8 and C1-C4 of the top sub-frame can be determined by applying geometry padding to sub-frame boundaries of the top sub-frame, and spherical neighboring pixels in the padding areas R9-R16 and C5-C8 of the bottom sub-frame can be determined by applying geometry padding to sub-frame boundaries of the bottom sub-frame.

Since the top sub-frame and associated padding areas R1-R8 and C1-C4 are stored in one working buffer 140/150 and the bottom sub-frame and associated padding areas R9-R16 and C5-C8 are stored in another working buffer 140/150, the SAO filter 134/144 can perform a pixel classification process (which is used for classifying a pixel in a block into one of categories for a given EO class) and/or a filter process (which is used for computing an offset of each of categories 1-4 for a given EO class) on the working buffers 140/150.

For example, when the current pixel to be classified by the horizontal pattern shown in FIG. 5 is included in one square projection face and is on a sub-frame boundary, one of the neighboring pixels may be obtained from a padding area being one of the padding areas R1-R16 shown in FIG. 10; when the current pixel to be classified by the vertical pattern shown in FIG. 6 is included in one square projection face and is on a sub-frame boundary, one of the neighboring pixels may be obtained from a padding area being one of the padding areas R1-R16 shown in FIG. 10; when the current pixel to be classified by the 135-degree diagonal pattern shown in FIG. 7 is included in one square projection face and is on a sub-frame boundary, one of the neighboring pixels may be obtained from a padding area being one of the padding areas R1-R16 and C1-C8 shown in FIG. 10; and when the current pixel to be classified by the 45-degree diagonal pattern shown in FIG. 8 is included in one square projection face and is on a sub-frame boundary, one of the neighboring pixels may be obtained from a padding area being one of the padding areas R1-R16 and C1-C8 shown in FIG. 10.

For another example, when a block (e.g., CTB) is across an image content discontinuity edge between face boundaries of two projection faces, one or more padding pixels may be obtained from a padding area being one of the padding areas R6-R8 and R14-R16 shown in FIG. 10, and may be used for calculating an offset of one EO category for a given EO class.

To put it simply, SAO filtering which is applied to pixels near the image content discontinuity edge between the top sub-frame and the bottom sub-frame is more accurate because neighboring pixels found by the edge pixel duplication scheme, the face based scheme or the geometry based scheme are available in the padding areas appended to the bottom sub-frame boundary of the top sub-frame and the top sub-frame boundary of the bottom sub-frame. Furthermore, since a neighboring pixel can be set by an edge pixel (which is already available in the reconstructed projection-based frame R/R') or a spherical neighboring pixel (which can be found due to inherent geometry continuity characteristics of the 360 VR content that is projected onto projection faces packed in a 360 VR layout), the SAO filter 134/144 that employs the proposed padding-based SAO filtering method is allowed to apply SAO filtering to pixels located on picture boundaries of the reconstructed projection-based frame R/R'.

In some embodiments of the present invention, the edge pixel duplication scheme/face based scheme/geometry based scheme finds neighboring pixels (which act as padding pixels outside two sub-frames) and stores the found neighboring pixels into sub-frame buffers (e.g., working buffers 140/150) before the SAO filtering process. There is tradeoff between the buffer size and the computational complexity. To reduce the memory usage of the working buffers 140/150, neighboring pixels (padding pixels) can be found by the edge pixel duplication scheme/face based scheme/geometry based scheme in an on-the-fly manner. Hence, during the SAO filtering process, neighboring pixels located outside a currently processed sub-frame can be padded/created dynamically when needed. When the on-the-fly computation of neighboring pixels (padding pixels) is implemented in one or both of the SAO filters 134 and 144, the video encoder 116 is allowed to have a single working buffer 140 that acts as a picture buffer for buffering the reconstructed projection-based frame R, and/or the video decoder 122 is allowed to have a single working buffer 150 that acts as a picture buffer for buffering the reconstructed projection-based frame R'. The buffer requirement is relaxed due to the fact that a picture buffer is created in a memory device without extra areas for storing padding pixels. However, the execution time of the padding-based SAO filtering method may be longer due to the on-the-fly computation which finds needed padding pixels on demand.

In above embodiments, padding is appended to sub-frame boundaries of each sub-frame included in the reconstructed projection-based frame R/R'. However, this is for illustrative purposes only, and is not meant to be a limitation of the present invention. Alternatively, padding may be appended to face boundaries of each projection face included in the reconstructed projection-based frame R/R'. In accordance with the proposed padding-based SAO filtering method that is applied to pixels near continuous face edges, at least one of the pixels required by EO category classification of one pixel (or required by offset determination of one EO category) is a padding pixel found by the SAO filter 134/144.

Please refer to FIG. 9 again. Consider a case where the face boundary FB1 of the first projection face connects with the face boundary FB2 of the second projection face in a reconstructed projection-based frame, and an edge EG_D between face boundaries FB1 and FB2 is an image content continuity edge (i.e., continuous face edge). That is, there is image content continuity between the face boundary FB1 of the first projection face and the face boundary FB2 of the second projection face due to continuous projection faces. For example, the face boundaries FB1 and FB2 are S14 and S22 shown in FIG. 2, or S24 and S32 shown in FIG. 2, or S61 and S53 shown in FIG. 2, or S51 and S41 shown in FIG. 2. However, it is possible that the continuous image content across the edge EG_D is bent at the edge EG_D due to the employed 360 VR projection. If the neighboring pixels N0, N1, and N2 shown in sub-diagram (a) of FIG. 9 are used by EO category classification of the current pixel PC, SAO filtering of the current pixel PC may suffer from a less accurate classification result as well as a less accurate offset calculation/selection.

As shown in the sub-diagram (b) of FIG. 9, padding is applied to the face boundary FB1 on which the current pixel PC is located. Hence, padding pixels D0, D1, and D3 take the place of the neighboring pixels N0, N1, and N2 in the second projection face, and are used by EO category classification of the current pixel PC in the first projection face. With proper settings of padding pixels D0, D1, and D3, a more accurate classification result of the current pixel PC can be obtained by the SAO filter 134/144. In this way, a more accurate offset can be calculated/selected for the current pixel PC.

The same concept can be applied to a filter process which is used for calculating an offset of one category for a given EO class. For example, padding pixels may be created to take the place of some reconstructed pixels (e.g., non-real neighboring pixels) originally available in a block (e.g., CTB) to be SAO filtered. Hence, a block (e.g., CTB) that undergoes SAO filtering may include reconstructed pixels (which are originally available in the block) and padding pixels (which are extended from at least one face boundary). In other words, padding pixels are involved in offset determination for a given EO class.

Figure 15:
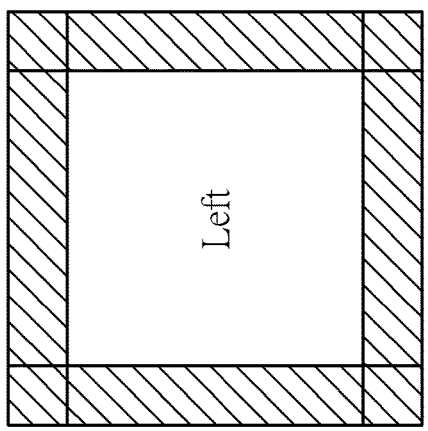
FIG. 15 is a diagram illustrating another arrangement of reconstructed frame data and padding pixel data stored in working buffers of an SAO filter according to an embodiment of the present invention.
Figure 15:
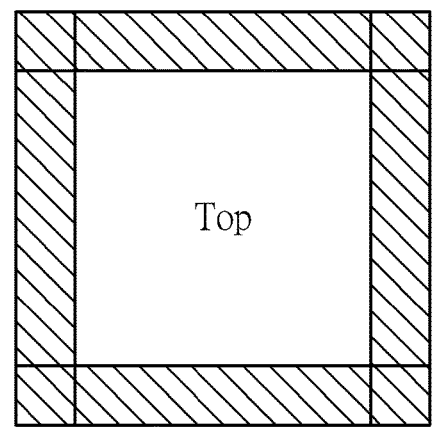
Figure 15:
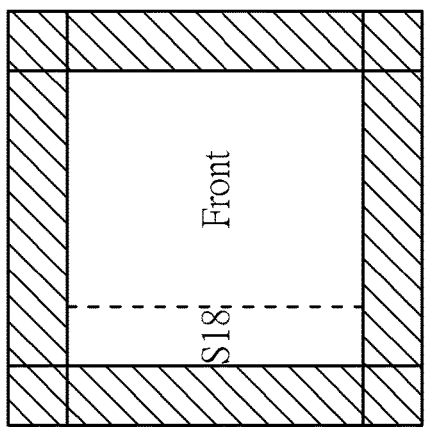
Figure 15:
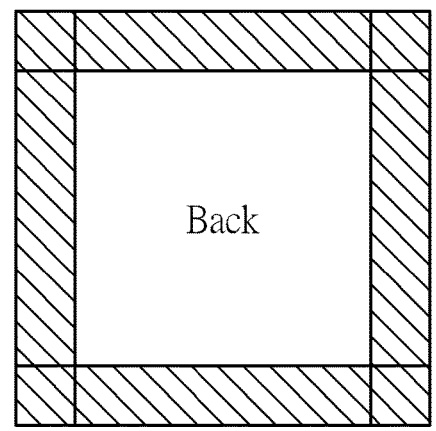
Figure 15:
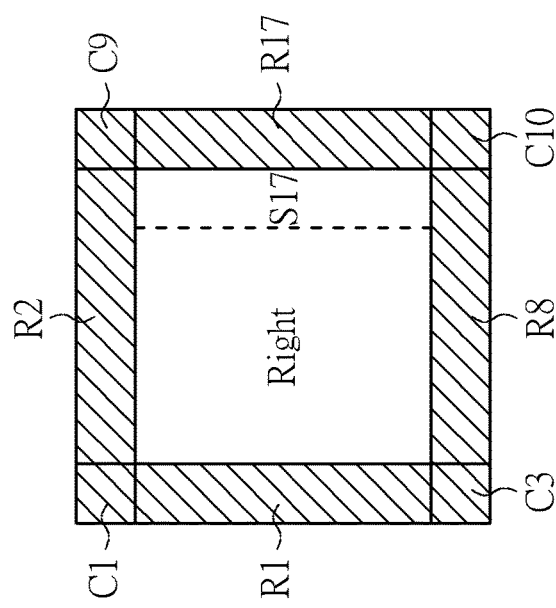
Figure 15:
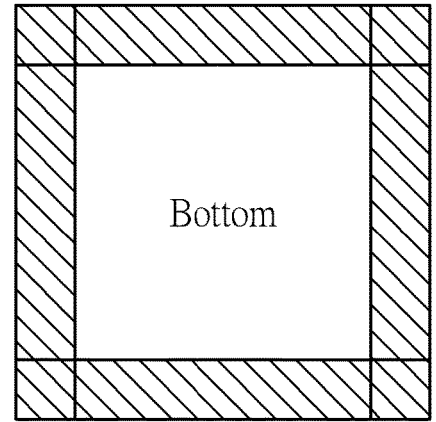

FIG. 15 is a diagram illustrating another arrangement of reconstructed frame data and padding pixel data stored in working buffers 140/150 of SAO filter 134/144 according to an embodiment of the present invention. Suppose that the reconstructed projection-based frame R/R' employs the compact CMP layout 204. Hence, padding added to face boundaries of square projection faces "Right", "Front", "Left", "Top", "Back", and "Bottom" includes padding added to sub-frame boundaries of the top sub-frame and bottom sub-frame and padding added to continuous face boundaries between adjacent square projection faces that are continuous projection faces. Taking the square projection face "Right" for example, padding areas R1, R2, R8 may be generated by the edge pixel duplication scheme, the face based scheme or the geometry based scheme, and padding areas C1, C3, C9, C10 may be generated by the geometry based scheme or generated by repeating corner pixels. Regarding the padding area R17, it may be generated by the edge pixel duplication scheme or the geometry based scheme. It should be noted that there is image content continuity between the right face boundary of the square projection face "Right" and the left face boundary of the square projection face "Front". In other words, an image area S17 in the square projection face "Right" and a neighboring image area S18 in the square projection face "Front" are on opposite sides of an image content continuity edge between the square projection faces "Right" and "Front". The padding area R17 acts as an extension of the right face boundary of the square projection face "Right". When spherical neighboring pixels are found and used as padding pixels of the padding area R17, a region on the sphere 200 to which the padding area R17 corresponds is adjacent to a region on the sphere 200 from which the square projection face "Right" is obtained. In other words, the padding area R17 is a spherical neighbor of the image area S17 in the square projection face "Right".

The video encoder 116 may be configured to have six working buffers 140 that act as projection face buffers. In addition, the video decoder 122 may be configured to have six working buffers 140/150 that act as projection face buffers. A first projection face buffer is used to store the square projection face "Right" and associated padding areas extended from face boundaries. A second projection face buffer is used to store the square projection face "Front" and associated padding areas extended from face boundaries. A third projection face buffer is used to store the square projection face "Left" and associated padding areas extended from face boundaries. A fourth projection face buffer is used to store the square projection face "Top" and associated padding areas extended from face boundaries. A fifth projection face buffer is used to store the square projection face "Back" and associated padding areas extended from face boundaries. A sixth projection face buffer is used to store the square projection face "Bottom" and associated padding areas extended from face boundaries.

The SAO filter 134/144 performs SAO filtering processes on data stored in the projection face buffers. To reduce the memory usage of the working buffers 140/150, neighboring pixels (padding pixels) can be found by the edge pixel duplication scheme/face based scheme/geometry based scheme in an on-the-fly manner. Hence, during the SAO filtering process, neighboring pixels located outside a currently processed projection face can be padded/created dynamically when needed. When the on-the-fly computation of neighboring pixels (padding pixels) is implemented in one or both of the SAO filters 134 and 144, the video encoder 116 is allowed to have a single working buffer 140 that acts as a picture buffer for buffering the reconstructed projection-based frame R, and/or the video decoder 122 is allowed to have a single working buffer 150 that acts as a picture buffer for buffering the reconstructed projection-based frame W.

When padding pixels in a padding area (e.g., one of the padding areas shown in FIG. 10 or FIG. 15) are found by the geometry based scheme, the padding pixels in the padding area may be directly discarded or overwritten by new padding pixels after the SAO filtering process. Alternatively, the padding pixels included in the padding area (e.g., one of the padding areas shown in FIG. 10 or FIG. 15) may be blended with pixels in the reconstructed projection-based frame R/R' to update the pixels in the reconstructed projection-based frame R/R'. Hence, the SAO filter 134/144 may be further arranged to deal with blending after SAO filtering.

Figure 16:
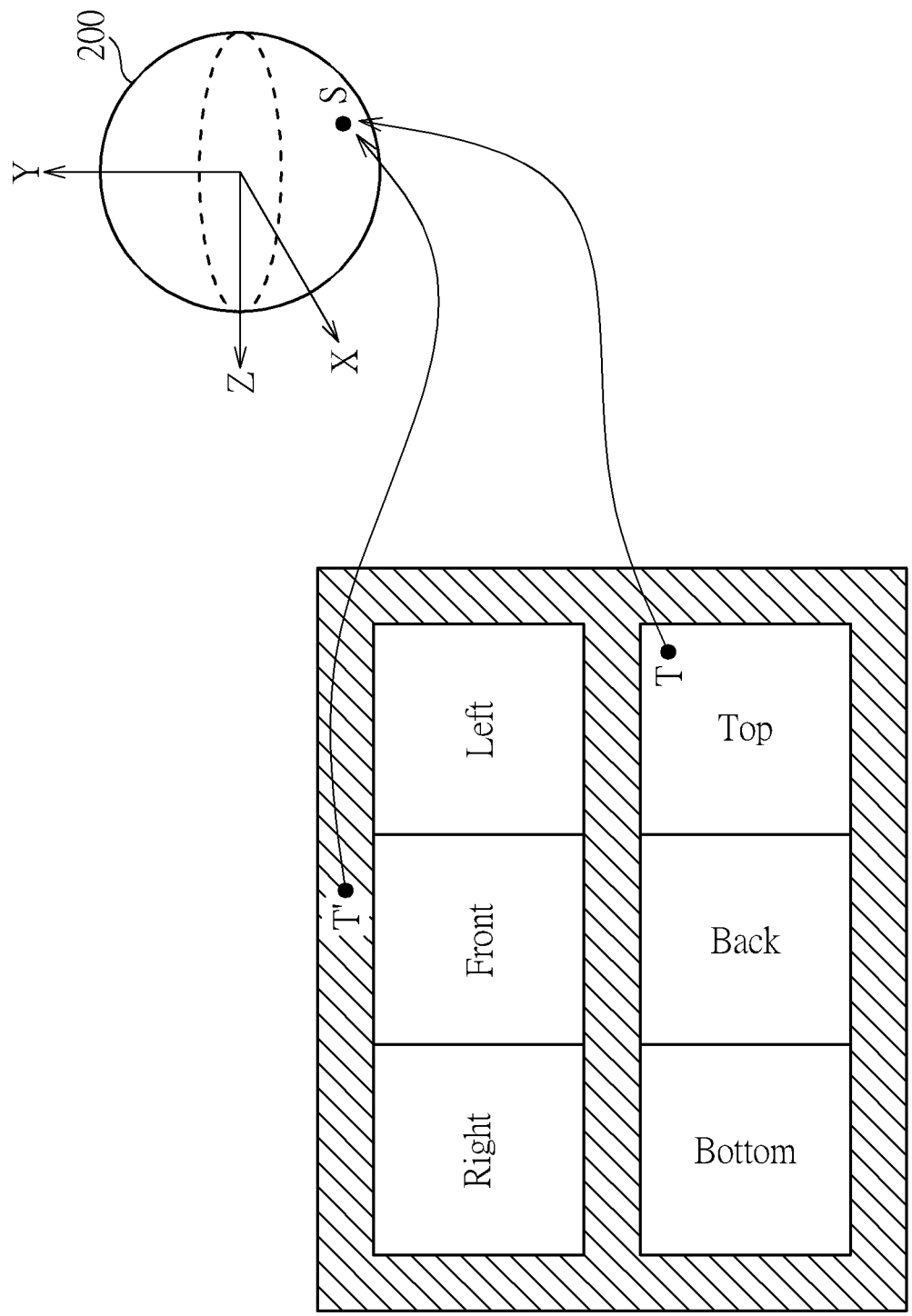
FIG. 16 is a diagram illustrating a blending process according to an embodiment of the present invention.

FIG. 16 is a diagram illustrating a blending process according to an embodiment of the present invention. A spherical neighboring pixel T' included in a padding area found by the geometry based scheme and a pixel T included in the square projection face "Top" packed in the reconstructed projection-based frame R/R' are mapped to the same point S on the sphere 200. After SAO filtering of the reconstructed projection-based frame R/R' is done, the pixel value q of the spherical neighboring pixel T' is used to update the pixel value p of the pixel T by a blending function p'=p*w+q*(1−w), where p' represents the updated pixel value of the pixel T, and w represents a weighting value between [0, 1].

In above embodiments, the proposed padding-based SAO filtering method is employed by the SAO filter 134/144 to deal with SAO filtering of pixels near sub-frame boundaries (or face boundaries) of the reconstructed projection-based frame R/R' with projection faces packed in a cube-based projection layout (e.g., compact CMP layout 204). However, this is for illustrative purposes only, and is not meant to be a limitation of the present invention. Alternatively, the proposed padding-based SAO filtering method may be employed by the SAO filter 134/144 to deal with SAO filtering of pixels near sub-frame boundaries (or face boundaries) of the reconstructed projection-based frame R/R' with projection faces packed in a different projection layout. For example, the 360 VR projection layout L_VR may be an equirectangular projection (ERP) layout, a padded equirectangular projection (PERP) layout, an octahedron projection layout, an icosahedron projection layout, a truncated square pyramid (TSP) layout, a segmented sphere projection (SSP) layout, or a rotated sphere projection layout.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A sample adaptive offset (SAO) filtering method for a reconstructed projection-based frame that comprises a plurality of projection faces packed in a projection layout of a 360-degree Virtual Reality (360 VR) projection from which a 360-degree image content of a sphere is mapped onto the projection faces, comprising:
    obtaining, by an SAO filter, at least one padding pixel in a padding area that acts as an extension of one face boundary of a first projection face, wherein the projection faces packed in the reconstructed projection-based frame comprise the first projection face and a second projection face; and in the reconstructed projection-based frame, said one face boundary of the first projection face connects with one face boundary of the second projection face, and there is image content discontinuity between said one face boundary of the first projection face and said one face boundary of the second projection face; and
    applying SAO filtering to a block, wherein the block has at least one pixel included in the first projection face, and said at least one padding pixel in the padding area is involved in said SAO filtering of the block;
    wherein each of said at least one padding pixel is a spherical neighboring pixel, and a region on the sphere to which the padding area corresponds is adjacent to a region on the sphere from which the first projection face is obtained.

2. The SAO filtering method of claim 1, wherein obtaining said at least one padding pixel comprises:
    directly using at least one pixel selected from one of the projection faces to act as said at least one padding pixel; or
    applying geometry mapping to at least one projected pixel on an extended area of the first projection face to find at least one point on one of the projection faces, and deriving said at least one padding pixel from said at least one point.

3. The SAO filtering method of claim 1, wherein the SAO filtering method further comprises:
    generating an updated pixel value of a first pixel by blending a pixel value obtained for the first pixel and a pixel value obtained for a second pixel, wherein the first pixel is located at a position included in one of the projection faces, the second pixel is selected from said at least one padding pixel, and the first pixel and the second pixel are mapped to a same point on the sphere.

4. The SAO filtering method of claim 1, wherein said SAO filtering of the block comprises a pixel classification process arranged to classify a pixel of the block into one of a plurality of categories for a given edge offset (EO) class, and said at least one padding pixel is involved in the pixel classification process.

5. The SAO filtering method of claim 1, wherein said SAO filtering of the block comprises a filter process arranged to determine an offset of one category for a given edge offset (EO) class, and said at least one padding pixel is involved in the filter process.

6. The SAO filtering method of claim 1, wherein said at least one padding pixel is dynamically created during said SAO filtering of the block.

7. A sample adaptive offset (SAO) filtering method for a reconstructed projection-based frame that comprises a plurality of projection faces packed in a projection layout of a 360-degree Virtual Reality (360 VR) projection from which a 360-degree image content of a sphere is mapped onto the projection faces, comprising:
    obtaining, by an SAO filter, at least one padding pixel in a padding area that acts as an extension of one face boundary of a first projection face, wherein the projection faces packed in the reconstructed projection-based frame comprise the first projection face and a second projection face; and in the reconstructed projection-based frame, said one face boundary of the first projection face connects with one face boundary of the second projection face, and there is image content discontinuity between said one face boundary of the first projection face and said one face boundary of the second projection face;
    applying SAO filtering to a block, wherein the block has at least one pixel included in the first projection face, and said at least one padding pixel in the padding area is involved in said SAO filtering of the block;
    obtaining at least one padding pixel in another padding area that acts as an extension of one picture boundary of the reconstructed projection-based frame; and
    applying SAO filtering to another block, wherein said another block includes at least one pixel included in one of the projection faces;
    wherein one face boundary of said one of the projection faces is a part of said one picture boundary of the reconstructed projection-based frame, and said at least one padding pixel in said another padding area is involved in said SAO filtering of said another block.

8. A sample adaptive offset (SAO) filtering method for a reconstructed projection-based frame that comprises at least one projection face packed in a projection layout of a 360-degree Virtual Reality (360 VR) projection from which a 360-degree image content of a sphere is mapped onto the projection faces, comprising:

obtaining, by an SAO filter, at least one padding pixel in a padding area that acts as an extension of one face boundary of a projection face packed in the reconstructed projection-based frame, wherein said one face boundary of the projection face is a part of one picture boundary of the reconstructed projection-based frame; and applying SAO filtering to a block, wherein the block has at least one pixel included in the projection face, and said at least one padding pixel in the padding area is involved in said SAO filtering of the block.

9. The SAO filtering method of claim 8, wherein obtaining said at least one padding pixel comprises:

directly replicating at least one edge pixel on said one face boundary of the projection face to act as said at least one padding pixel.

10. The SAO filtering method of claim 8, wherein each of said at least one padding pixel is a spherical neighboring pixel, and a region on the sphere to which the padding area corresponds is adjacent to a region on the sphere from which the projection face is obtained.

11. The SAO filtering method of claim 10, wherein obtaining said at least one padding pixel comprises:

directly using at least one pixel selected from said at least one projection face to act as said at least one padding pixel; or applying geometry mapping to at least one projected pixel on an extended area of the projection face to find at least one point on said at least one projection face, and deriving said at least one padding pixel from said at least one point.

12. The SAO filtering method of claim 10, wherein the SAO filtering method further comprises:

generating an updated pixel value of a first pixel by blending a pixel value obtained for the first pixel and a pixel value obtained for a second pixel,
wherein the first pixel is located at a position included in said at least one projection face, the second pixel is selected from said at least one padding pixel, and the first pixel and the second pixel are mapped to a same point on the sphere.

13. The SAO filtering method of claim 8, wherein said SAO filtering of the block comprises a pixel classification process arranged to classify a pixel of the block into one of a plurality of categories for a given edge offset (EO) class, and said at least one padding pixel is involved in the pixel classification process.

14. The SAO filtering method of claim 8, wherein said at least one padding pixel is dynamically created during said SAO filtering of the block.

* * * * *